US011074887B2

(12) United States Patent
Kanishima et al.

(10) Patent No.: US 11,074,887 B2
(45) Date of Patent: *Jul. 27, 2021

(54) GLASSES-TYPE WEARABLE TERMINAL AND DATA PROCESSING METHOD

(71) Applicant: KABUSHIKI KAISHA TOSHIBA, Tokyo (JP)

(72) Inventors: Yasuhiro Kanishima, Tokyo (JP); Akira Tanaka, Tokyo (JP); Kenichi Doniwa, Asaka Saitama (JP); Hiroaki Komaki, Tokyo (JP); Hiroki Kumagai, Tokyo (JP); Takashi Sudo, Tokyo (JP); Nobuhide Okabayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,809

(22) Filed: Sep. 10, 2019

(65) Prior Publication Data
US 2020/0005727 A1 Jan. 2, 2020

Related U.S. Application Data

(62) Division of application No. 15/917,338, filed on Mar. 9, 2018, now abandoned, which is a division of
(Continued)

(30) Foreign Application Priority Data

Sep. 3, 2015 (JP) .................. 2015-173648

(51) Int. Cl.
G02B 27/01 (2006.01)
G06T 19/00 (2011.01)
(Continued)

(52) U.S. Cl.
CPC ......... *G09G 5/006* (2013.01); *G02B 27/0172* (2013.01); *G06F 3/147* (2013.01);
(Continued)

(58) Field of Classification Search
CPC ...... G06F 9/30098; G06T 19/00; G02B 27/01
See application file for complete search history.

(56) References Cited

U.S. PATENT DOCUMENTS

2012/0044571 A1* 2/2012 Mukawa ............ G02B 27/0103
359/630
2013/0120449 A1 5/2013 Ihara et al.
(Continued)

FOREIGN PATENT DOCUMENTS

JP H05-211650 A 8/1993
JP H10-147411 A 6/1998
(Continued)

OTHER PUBLICATIONS

U.S. Appl. No. 14/979,203, filed Dec. 22, 2015 Final Office Action dated Jun. 1, 2018.
(Continued)

Primary Examiner — Matthew Salvucci
(74) Attorney, Agent, or Firm — Rutan & Tucker, LLP

(57) ABSTRACT

According to one embodiment, a display and a sensor signal acceptor which accepts detection signals from a sensor are provided. A first display controller displays a first instruction for instructing a first work on the display, based on the detection signal which indicates an end of preparation for the first work. And, a second display controller displays a second instruction for instructing a next second work on the display, based on the detection signal which indicates an end of the first work.

15 Claims, 24 Drawing Sheets

Related U.S. Application Data application No. 14/979,203, filed on Dec. 22, 2015, now abandoned.

(51) Int. Cl.
    *G09G 5/00*      (2006.01)
    *G06F 3/147*    (2006.01)
    *G06F 9/451*    (2018.01)
    *G06F 9/4401*  (2018.01)

(52) U.S. Cl.
    CPC .............. *G06F 9/453* (2018.02); *G06T 19/00* (2013.01); *G02B 2027/014* (2013.01); *G02B 2027/0178* (2013.01); *G06F 9/4411* (2013.01); *G09G 2370/16* (2013.01)

(56) References Cited

U.S. PATENT DOCUMENTS

| | | |
|---|---|---|
| 2014/0145079 A1 | 5/2014 | Omino |
| 2014/0240484 A1 | 8/2014 | Kodama et al. |
| 2014/0351191 A1 | 11/2014 | Kon et al. |
| 2016/0035351 A1 | 2/2016 | Sendai et al. |
| 2016/0049108 A1 | 2/2016 | Yajima et al. |
| 2016/0233413 A1 | 8/2016 | Zawada et al. |
| 2016/0286210 A1* | 9/2016 | Border ................ H04N 9/3185 |
| 2017/0069288 A1 | 3/2017 | Kanishima et al. |
| 2017/0132554 A1 | 5/2017 | Oonishi et al. |
| 2018/0044112 A1 | 2/2018 | Fujiwara et al. |
| 2018/0197502 A1 | 7/2018 | Kanishima et al. |

FOREIGN PATENT DOCUMENTS

| | | |
|---|---|---|
| JP | 2000-354943 A | 12/2000 |
| JP | 2001-101586 A | 4/2001 |
| JP | 2002-288294 A | 10/2002 |
| JP | 2003-196681 A | 7/2003 |
| JP | 2003-216687 A | 7/2003 |
| JP | 2004-102727 A | 4/2004 |
| JP | 2008-201569 A | 9/2008 |
| JP | 2009-279193 A | 12/2009 |
| JP | 2010-211623 A | 9/2010 |
| JP | 2010-271928 A | 12/2010 |
| JP | 2011-081737 A | 4/2011 |
| JP | 2011-118683 A | 6/2011 |
| JP | 2011-233108 A | 11/2011 |
| JP | 2011-248860 A | 12/2011 |
| JP | 2012-155528 A | 8/2012 |
| JP | 2012-212991 A | 11/2012 |
| JP | 2013-020422 A | 1/2013 |
| JP | 2014-164482 A | 9/2014 |
| JP | 2014-188043 A | 10/2014 |
| JP | 2014-228725 A | 12/2014 |
| JP | 2015-075832 A | 4/2015 |
| JP | 5696262 B1 | 4/2015 |
| JP | 2015-088175 A | 5/2015 |

OTHER PUBLICATIONS

U.S. Appl. No. 14/979,203, filed Dec. 22, 2015 Final Office Action dated May 10, 2019.
U.S. Appl. No. 14/979,203, filed Dec. 22, 2015 Non-Final Office Action dated Dec. 17, 2018.
U.S. Appl. No. 14/979,203, filed Dec. 22, 2015 Non-Final Office Action dated Jan. 17, 2018.
U.S. Appl. No. 15/917,338, filed Mar. 9, 2018 Final Office Action dated Aug. 28, 2019.
U.S. Appl. No. 15/917,338, filed Mar. 9, 2018 Final Office Action dated Sep. 28, 2018.
U.S. Appl. No. 15/917,338, filed Mar. 9, 2018 Non-Final Office Action dated Apr. 19, 2018.
U.S. Appl. No. 15/917,338, filed Mar. 9, 2018 Non-Final Office Action dated May 9, 2019.

* cited by examiner

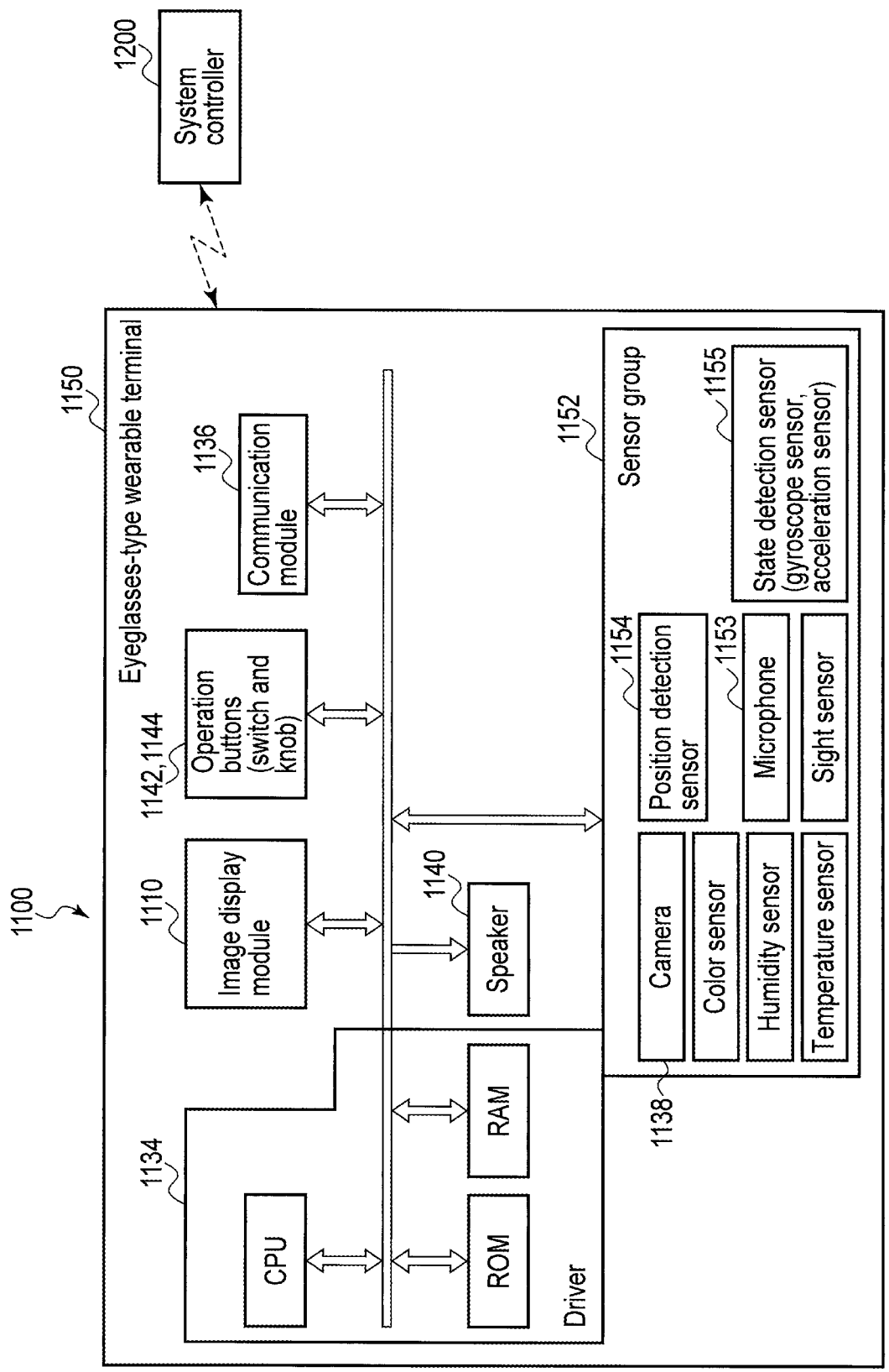
F I G. 4A

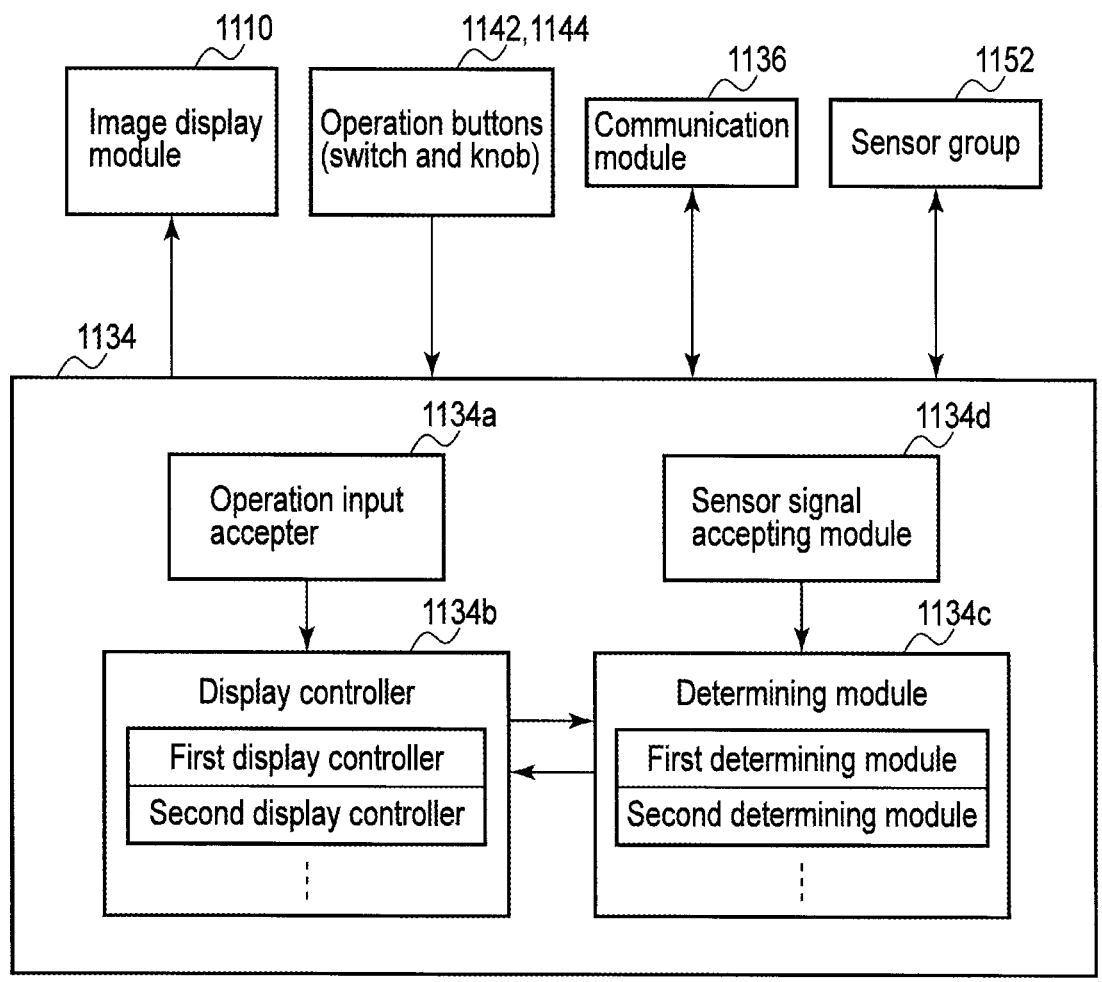
F I G. 4B

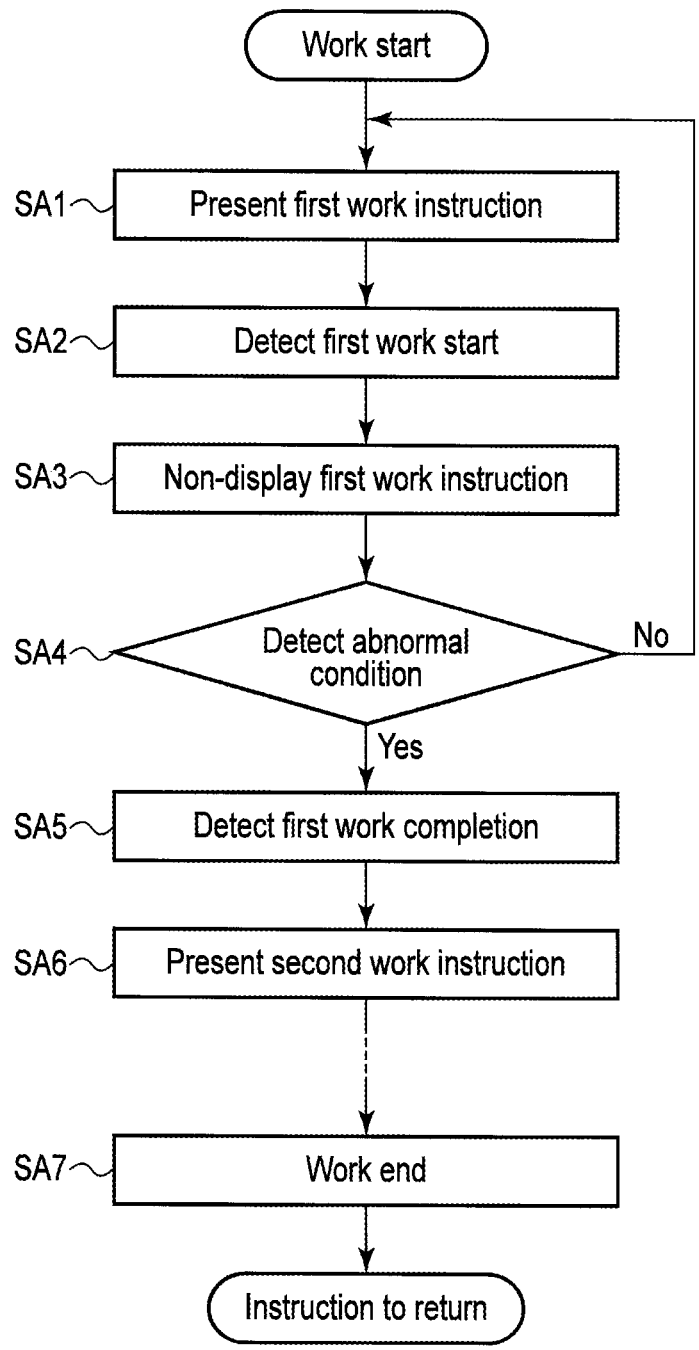
F I G. 5A

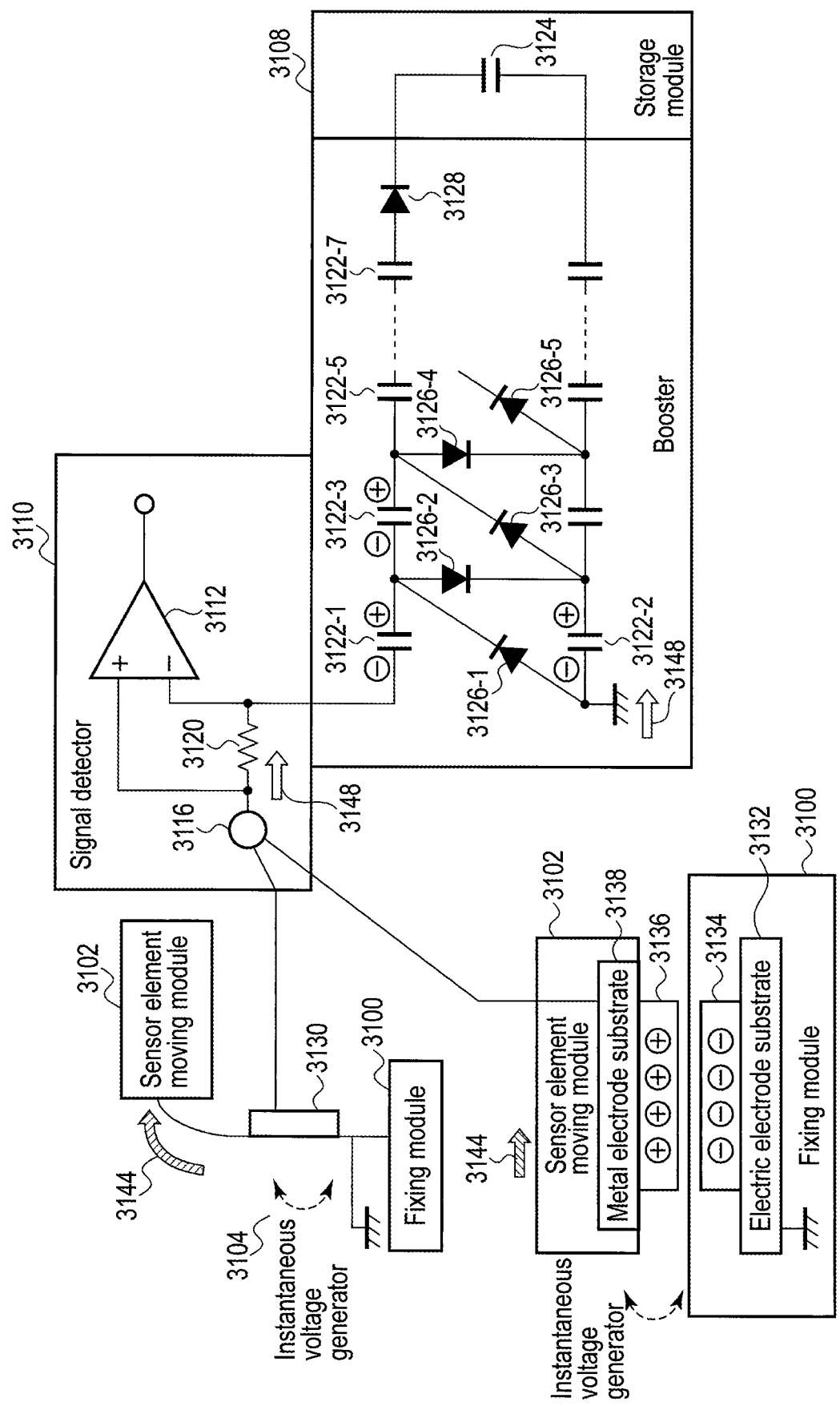
F I G. 15

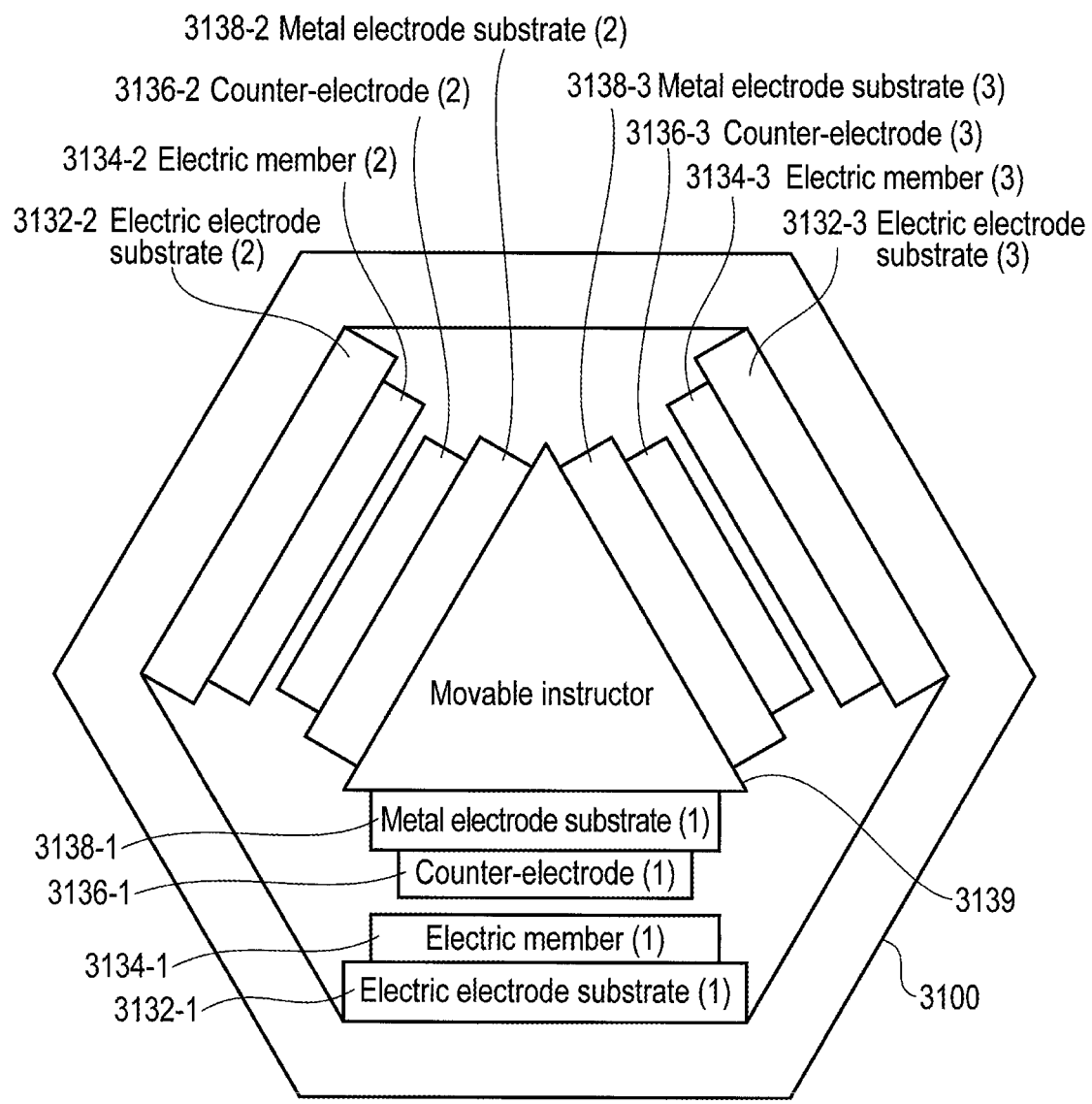
F I G. 17

| Synchronous header | Transmitting side address | Receiving side address | Changed value | Error-correction code |
|---|---|---|---|---|
| SYNC | SADRS | DADRS | VACHG | CRC |
F I G. 20
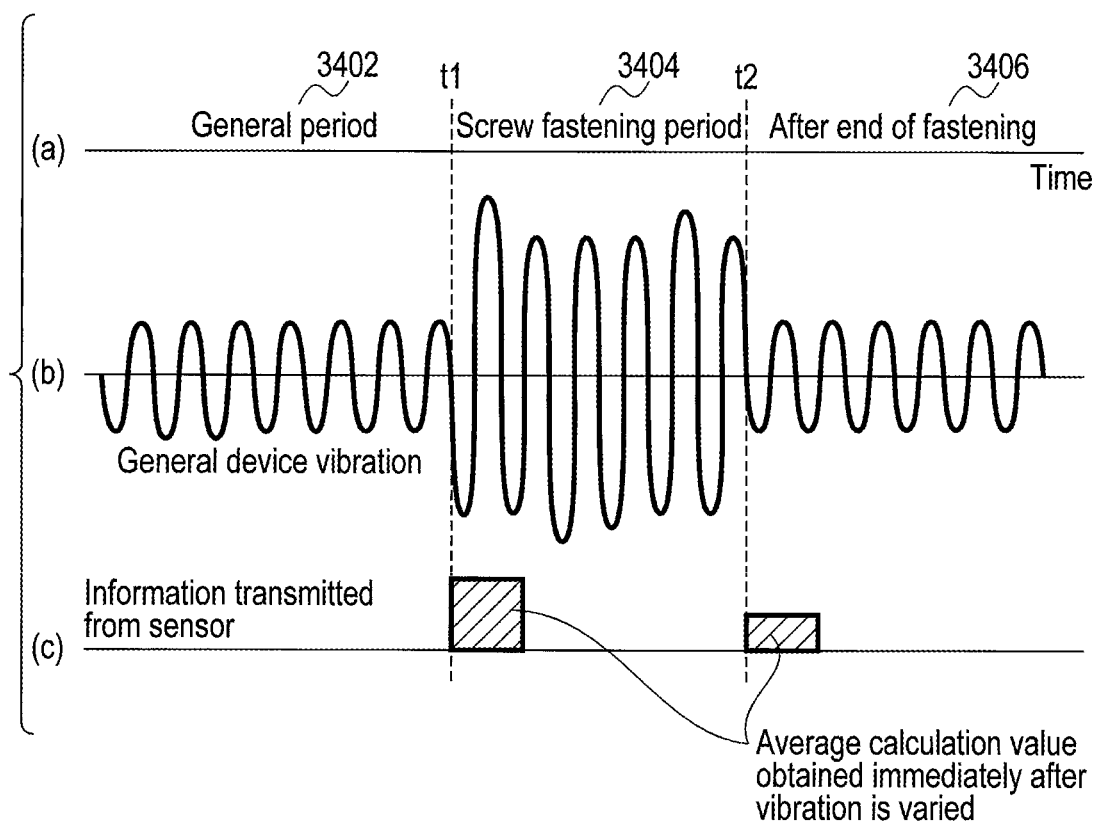
F I G. 21

GLASSES-TYPE WEARABLE TERMINAL AND DATA PROCESSING METHOD

CROSS-REFERENCE TO RELATED APPLICATIONS

This application is a divisional of U.S. patent application Ser. No. 15/917,338, filed Mar. 9, 2018, which is a divisional of U.S. patent application Ser. No. 14/979,203 filed Dec. 22, 2015, which is based upon and claims the benefit of priority from Japanese Patent Application No. 2015-173648, filed Sep. 3, 2015, the entire contents of which are incorporated herein by reference.

FIELD

Embodiments described herein relate generally to a glasses-type wearable terminal and a data processing method.

BACKGROUND

Recently, glasses equipped with a projector capable of projecting an image has been developed as a glasses-type wearable terminal. The glasses-type wearable terminal is often convenient for a worker who performs maintenance of various types of installation and manufacturing devices in a factory. The worker can see the contents of instructions through a projected image with the glasses-type wearable terminal and can execute the work instructed by the projected image with both hands in real time.

In addition, the worker can execute cooking of a meal, etc., with both hands, while looking at the recipe instructed through a projected image with a glasses-type wearable terminal.

The worker using the glasses-type wearable terminal can execute the instructed work with both hands in real time while seeing the contents of instructions given through a projected image with the glasses-type wearable terminal. For this reason, the worker does not need to move to a position different from the current work position to confirm a content of next work direction or confirm the content of instruction on a display of an installed personal computer, in a conventional manner.

Even if the worker considers having worked based on the content of work instruction, however, the worker often does not work actually (or forgets work steps) or, even if the worker works, the content of work often is imperfect. For example, since noise occurs during the work, the worker may forget the work performance of a certain step (or the work may be imperfect) or the worker may forget closing a door (or close a door imperfectly). In such a case, when the device for the work (a manufacturing device, a conveying device or the like) works again, an accident may occur for the reason that the worker forgets the work and the work is imperfect.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4A is a diagram showing an example of functional blocks of the glasses-type wearable terminal as the example of the present embodiment.

FIG. 4B is a diagram showing an example of a specific function of the driver 1134 shown in FIG. 4A.

FIG. 5A is a flowchart showing an operation example of a system using the glasses-type wearable terminal of the present embodiment.

FIG. 15 is an illustration (5) of the principle of power storage in the environmental vibration power generation device.

FIG. 17 is an illustration (1) of arrangement of instantaneous voltage generators included in the sensor.

FIG. 20 is an illustration of a structure in communication information transmitted from a sensor to a system controller.

FIG. 21 is an illustration for explanation of a vibration property obtained before and after a screw fastening work.

DETAILED DESCRIPTION

Various embodiments will be described hereinafter with reference to the accompanying drawings.

In general, according to one embodiment, a glasses-type wearable terminal and a data processing method are provided, wherein during work, such as artificial manipulation and autonomous working, obtaining the certainty of work is supported.

According to one embodiment, a glasses-type wearable terminal, comprising: a display; a sensor signal acceptor which accepts detection signals from a sensor; a first display controller which urges a first instruction for executing a first operation to be displayed on the display, based on the detection signal accepted by the sensor signal acceptor, which indicates an end of preparation for the operation; and a second display controller which urges a second instruction for executing a next second operation to be displayed on the display, based on the detection signal accepted by the sensor signal acceptor, which indicates an end of the first operation.

An embodiment will further be described with reference to the drawings.

Embodiments will be described hereinafter with reference to the accompanying drawings.

Figure 1:
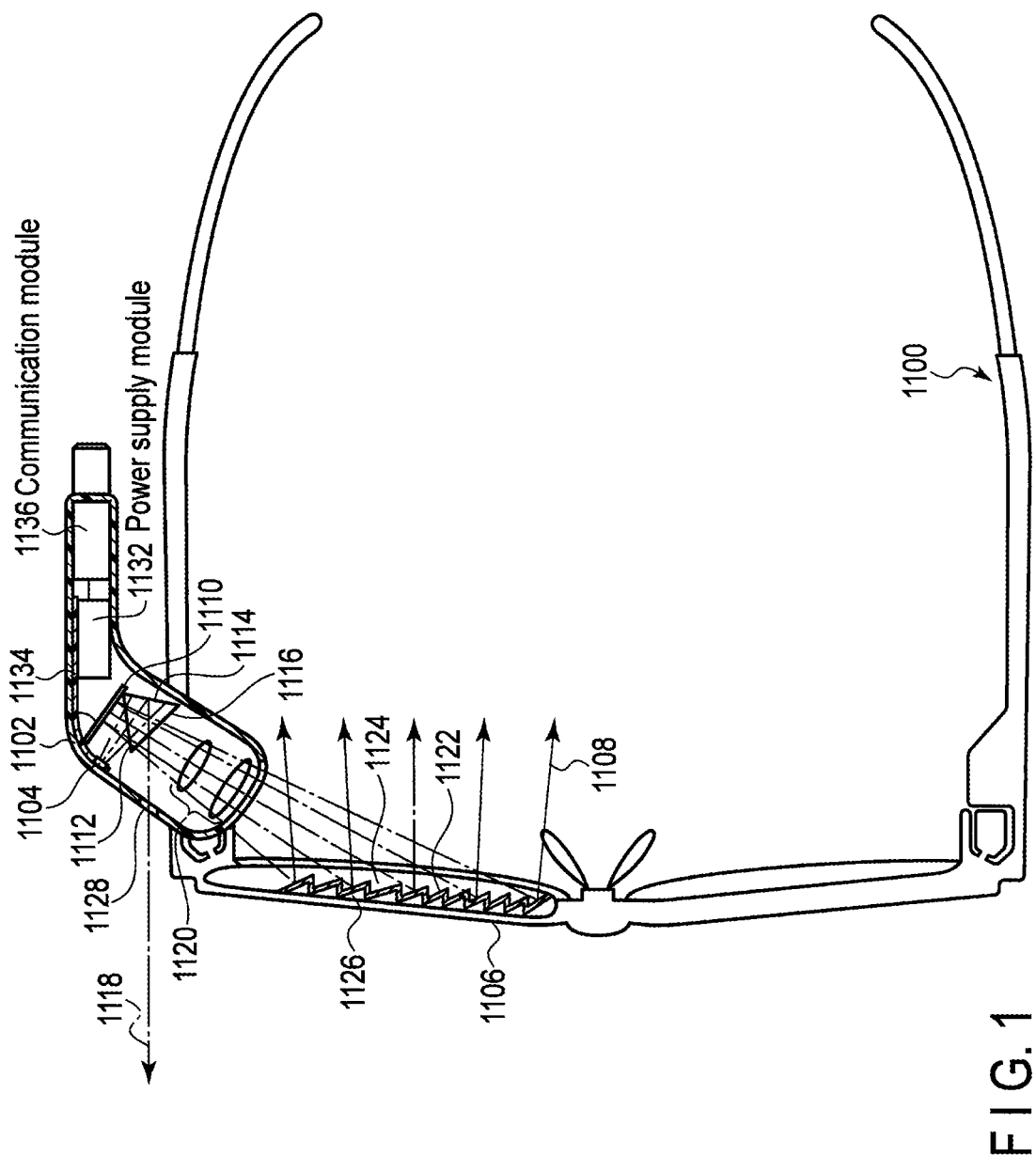
FIG. 1 is an illustration for explaining a configuration of a glasses-type wearable terminal as an example of the present embodiment.
Figure 2:
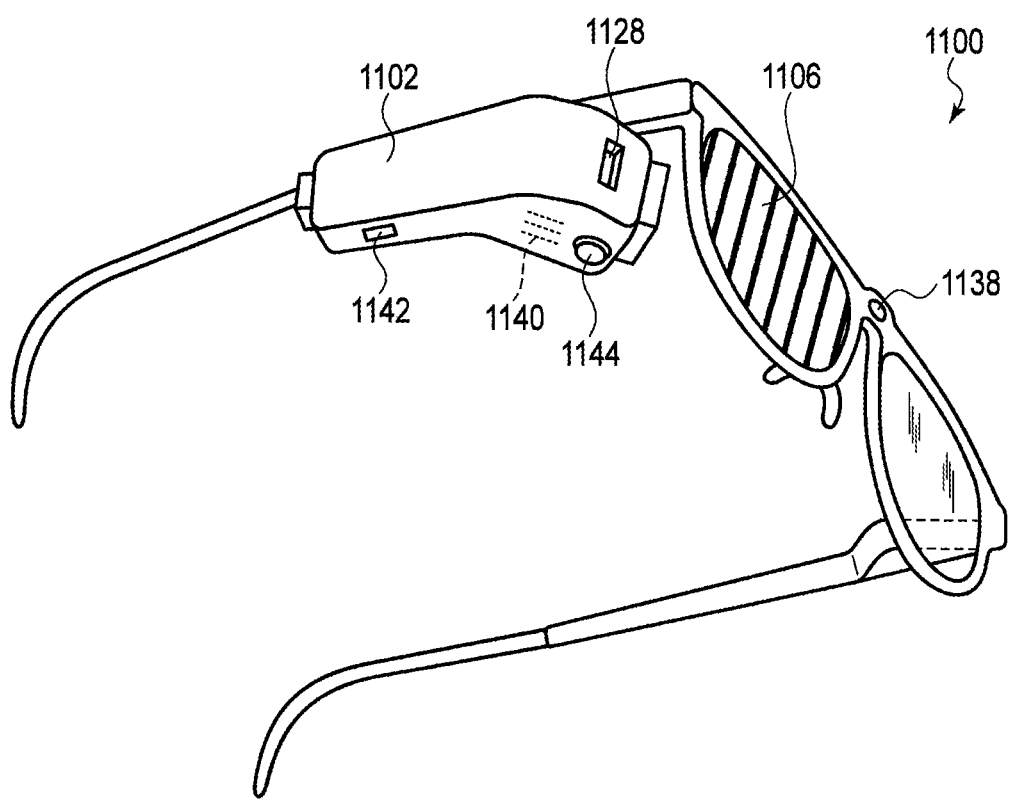
FIG. 2 is a perspective view showing the glasses-type wearable terminal as the example of the present embodiment.

FIG. 1 and FIG. 2 are schematic diagrams showing an example of a wearable terminal of one of the embodiments. A wearable terminal is a portable terminal device. The wearable terminal is explained as a glasses-type wearable terminal in the present embodiment. The glasses-type wearable terminal may comprise a camera, a microphone, a vibration detecting function or the like to detect a predetermined instruction input (control information) from a wearer. The instruction inputs from the wearer include, for example, blocking a lens portion of the camera by a hand, clapping hands for the microphone or requesting a next display by sound, giving a predetermined vibration to the vibration detecting function, etc. The wearer (worker) can use the glasses-type wearable terminal in a hands-free state.

A glasses-type wearable terminal 1100 comprises a projector (display information producer) 1102, a screen (optical path synthesizer) 1106, a driver (often called an image display circuit, a light source driving circuit or a signal processor) 1134, a wireless communication module 1136, etc., and operates with the power supplied from a power supply module 1132 which is, for example, a button battery.

The projector 1102 executes communications, i.e., delivers and receives information with an information management server or a system controller (not shown) connected with an external network NTW, through the wireless communication module 1136.

In addition, the projector 1102 comprises a light source module 1104, an image display module 1110, a half-mirror surface 1112, a full-reflection surface 1114, an emission surface 1116, a lens group 1120, etc. The projector 1102 illuminates an image or information displayed by the image display module 1110, by non-parallel light (divergent light; hereinafter called divergent light) emitted from the light source module 1104, and emits (outputs) the projected image which is the reflected light (of the illumination light).

The light source module 1104 should preferably be a dimming-type white LED light source (L-cos) in which a plurality of, for example, three light emitting diodes (LED) are different in light color and an output light quantity of each diode can be varied independently. If an environment of use of the glasses-type wearable terminal 1100 is, for example, a clean room in which, for example, illumination mainly based on an orange color is often used, the light color can be changed in accordance with the environment of use by using the dimming-type white LED light source for the light source module 1104. In addition, by using the dimming-type white LED light source for the light source module 1104 and outputting a display color which can easily be seen for the wearer, occurrence of elements which are troubles for the wearer, such as eye fatigue and its attendant migraine, can be avoided as compared with a case of outputting a display color which can hardly be seen for the wearer.

The image display module 1110 is, for example, a reflection LCD module and displayed a predetermined image, based on display control of the driver 1134.

Light 1108 output from the light source module 1104 is reflected on the half-mirror surface 1112 to illuminate the image displayed on the image display module 1110, and is reflected again as image light corresponding to the image (often called image light) corresponding to the image.

The driver 1134 also controls the light emitted from the light source module 1104 in association with the image (image light) displayed on the image display module 1110.

The screen 1106 comprises a rear transparent refractor 1124, a Fresnel lens type half-mirror surface 1122, and a front transparent refractor 1126.

The light (image light) 1108 reflected at the image display module 1110 of the screen 1106 passes through the half-mirror surface 1112 and the emission surface 1116. Then, the image light is given a predetermined image size by the lens group 1120 and reaches the Fresnel lens type half-mirror surface 1122 of the optical path synthesizer 1106.

The image light 1108 passing through the lens group 1120 and reaching the Fresnel lens type half-mirror surface 1122 of the screen 1106 is reflected in part on the Fresnel lens type half-mirror surface 1122 to form a virtual image corresponding to the image (image light) displayed on the image display module 1110.

The screen 1106 transmits a part of an image seen in the extension of a line of sight of the wearer (wearing the glasses-type wearable terminal 1100), i.e., a background image and displays the image together with the image light corresponding to the image such that the wearer can visually recognize the image.

Part of the image light (divergent light) 1108 emitted from the light source module 1104 and passing through the half-mirror surface 1112 is wholly reflected on the full-reflection surface 1114 and refracted on the emission surface 1116, and becomes leakage light 1118 (i.e., divergent light) from the light source module 1104. The leakage light 1118 is released to the outside through an opening or a gap (guide portion) 1128. A function of obtaining the leakage light 1118 is not indispensable.

As shown in FIG. 2, the glasses-type wearable terminal 1100 comprises operation buttons including a speaker 1140, a (slide) switch 1142, a (rotary) knob 1144, etc., at a predetermined position of the projector 1102, for example, on a bottom surface portion of the projector 1102. The switch 1142 can adjust, for example, luminance of the image light 1108 emitted from the projector 1102. The knob 1144 can adjust, for example, an angle of projection of the image light 1108 emitted from the projector 1102. The wearer (user) can adjust the luminance and the angle of projection by blind touch while visually recognizing the image projected on the screen 1106, by operating the switch 1142 and the knob 1144. In other words, display luminance and color tone of the image suitable for taste of the user (wearer) can be provided by operating the switch 1142. In addition, the image can be displayed at an optimum position in accordance with the shape and size of the head of the user (wearer), by adjusting the angle of projection by the knob 1144. The positions of the switch 1142 and the knob 1144 may be opposite to each other.

The position of the glasses-type wearable terminal (wearer) and the wearer's state can be detected by using the leakage light from the glasses-type wearable terminal shown in FIG. 1 and FIG. 2. The principle of detecting the position of the glasses-type wearable terminal (wearer) and the wearer's state will be explained with reference to FIGS. 4A and 4B.

Figure 3:
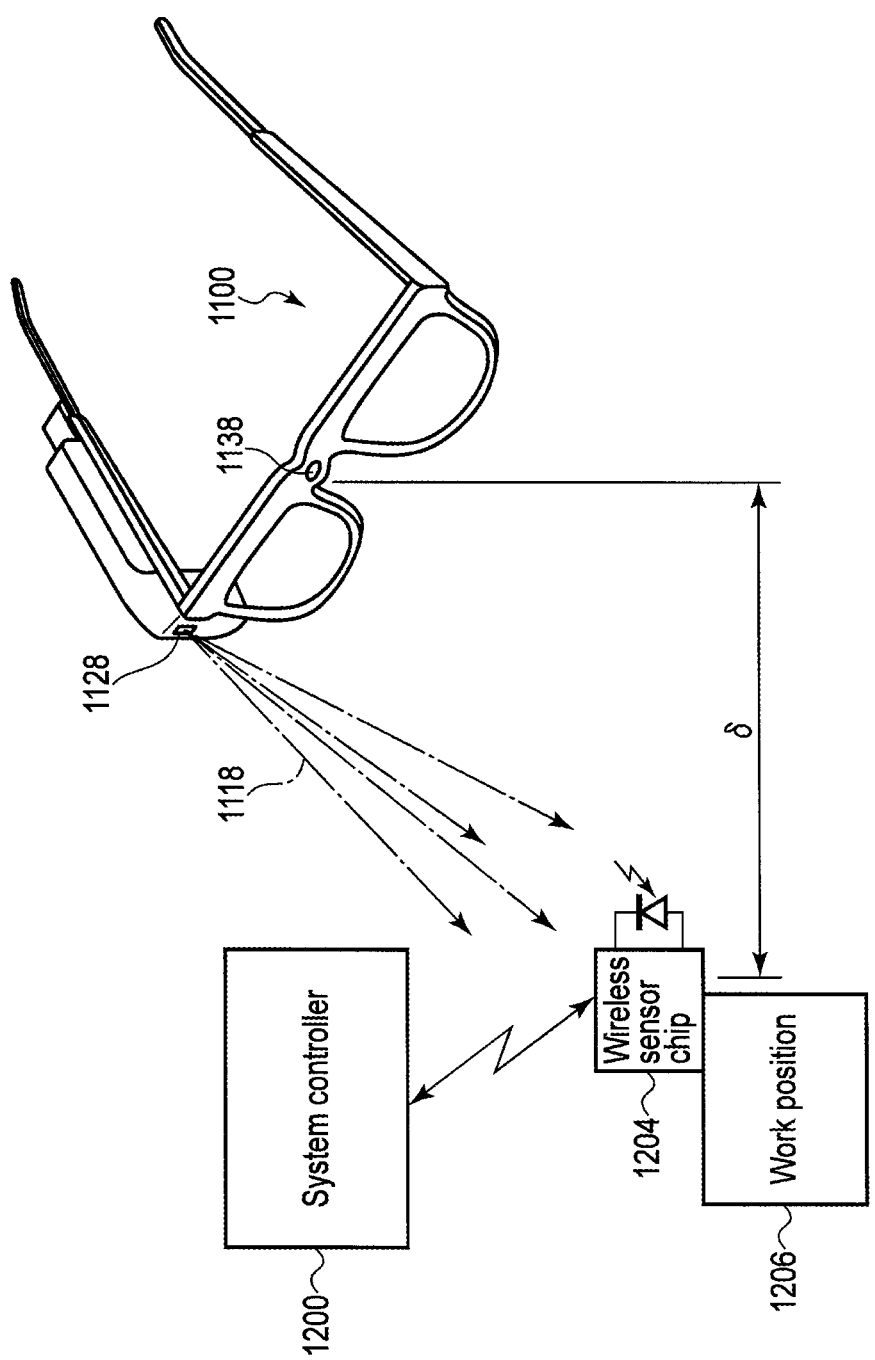
FIG. 3 is an illustration showing an example of a position detection system using the glasses-type wearable terminal as the example of the present embodiment.

FIG. 3 is a schematic illustration showing a basic concept of the detection system of the embodiment using the leakage light 1118 from the light source module 1104 of the glasses-type wearable terminal 1100.

The detection system of the embodiment includes at least one glasses-type wearable terminal 1100 (-1 to -m), at least one wireless sensor chip 1204 (-1 to -n), and a system controller 1200. They can receive and deliver the information by mutual communications. The mutual communications may be wired or wireless communications, but should preferably be, for example, near field communication such as Bluetooth (registered trademark). More preferably, if they collaborate with each other by near field communication, collaborative operations and collaborative processing between the glasses-type wearable terminal 1100 and the wireless sensor chip 1204 can be executed without receiving an influence from free movement of the glasses-type wearable terminal 1100. Alternatively, if they collaborate with each other by near field communication, collaborative operations and collaborative processing between the glasses-type wearable terminal 1100 and the wireless sensor chip 1204 can be executed without receiving an influence from free change of the arrangement location of the wireless sensor chip 1204. The wireless communication scheme applied to the present system is not limited, various types of the communication schemes may be adopted and the wireless communication schemes may be changeable.

In the detection system of the embodiment, the light 1108 output from the light source module 1104 of the glasses-type wearable terminal 1100 is intermittently modulated with the information including identification of the glasses-type wearable terminal (Identification: hereinafter often called terminal ID) such that the individual identification information, i.e., an arbitrary number of glasses-type wearable terminals 1100 can be identified. For example, the light 1108 emitted from the light source module 1104 is modulated with the information signal including the terminal ID. The wireless sensor chip 1204 transmits the received information signal to the system controller 1200. The system controller can thereby associate the glasses-type wearable terminal 1100 with the wireless sensor chip 1204.

In the detection system of the embodiment, as explained above, the glasses-type wearable terminal 1100 is used as "an information transmission source" by using the leakage light 1118. Thus, the multi-functional glasses-type wearable terminal 1100 can be implemented with the information transmission function besides the display function of the glasses-type wearable terminal 1100. Then, variety of the system comprising the glasses-type wearable terminal 1100 can be achieved.

As the method of modulating the amount of light emission of the light source module 1104, for example, not a chopper-type modulation scheme of intermittently reducing the amount of light emission to zero, but a modulation scheme of maintaining the amount of light emission more than a predetermined amount even if the light amount is small is adopted. Burden on the wearer's eyes can be thereby reduced. As regards the modulation scheme, for example, a digital sum value (DSV) free modulation scheme (i.e., a scheme of calculating DSV of a modulated signal at any time and) is adopted. Thus, variation in the amount of light emission can be suppressed in a comparatively long range (i.e., variation in the amount of light emission can be macroscopically reduced to zero at any time) and the burden on the wearer's eyes can be further reduced.

An effect of reducing the burden on the wearer's eyes can also be produced by setting the reference frequency of the modulation to be higher than or equal to 10 Hz, for example, higher than or equal to 20 Hz, more preferably, higher than or equal to 60 Hz since an eye of a person can recognize a variation of approximately 0.02 seconds. In contrast, since the LED used in the light source module 1104 has an inner impedance and connection capacitance, the modulation frequency of good accuracy should preferably be lower than 100 MHz, more desirably, 10 MHz. Therefore, the reference frequency of modulation at the light source module 1104 used in the detection system of the embodiment should preferably be in a range of 10 Hz to 100 MHz, more desirably, 10 Hz to 10 MHz.

In addition, the leakage light 1118 (transmitted light 1158) which is the divergent light from the light source module 1104 is used in the detection system of the embodiment. The amount of the light detected by the wireless sensor chip 1204 is thereby varied in accordance with a distance δ between the glasses-type wearable terminal 1100 and the wireless sensor chip 1204. By using this phenomenon, the distance between the glasses-type wearable terminal 1100 and the wireless sensor chip 1204 (or the orientation of the glasses-type wearable terminal 1100 to the wireless sensor chip 1204) can be predicted.

The light can be detected within a comparatively wide range by using the divergent light as the leakage light 1118 (transmitted light 1158) from the light source module 1104. As a result, the position of the glasses-type wearable terminal 1100 (i.e., the distance between the glasses-type wearable terminal 1100 and the wireless sensor chip 1204 or the glasses-type wearable terminal 1100 (i.e., the orientation of the orientation of the glasses-type wearable terminal 1100 to the wireless sensor chip 1204) can be detected by merely installing a comparatively small number of wireless sensor chips 1204 (-1 to -n). An expense required to install the detection system can be thereby reduced.

The light amount information of the leakage light 1118 (transmitted light 1158) from the light source module 1104, which is detected by the wireless sensor chip 1204 is transmitted from the wireless sensor chip 1204 to the system controller (or an information management server) at predetermined timing. The system controller 1200 analyzes the information from the wireless sensor chip 1204 which is collected by the system controller (or compiled in the information management server). The position of an arbitrary glasses-type wearable terminal 1100 (-1 to -m), i.e., the wearer and the wearer's state can be thereby estimated.

In the embodiment shown in FIG. 3, the wireless sensor chip 1204 is fixed and the glasses-type wearable terminal 1100 is movable on a workbench 1206 (i.e., a rack or a work space). However, the wireless sensor chip 1204 (and the workbench 1206 or the article) may also be movable. In this case, the movable workbench 1206 or a distributed state of the article may also be detected by mutual communication between the wireless sensor chip 1204 attached to the article or the movable workbench 1206 and the glasses-type wearable terminal 1100 at a determined position (i.e., the fixed position or the state of being used by the user).

FIG. 4A shows an example of a main electric processing block 1150 of the glasses-type wearable terminal 1100. Portions like or similar to those shown in FIG. 2 and FIG. 3 are denoted by the same reference numbers and symbols. The driver 1134 comprises a central processing unit (CPU), a read-only memory (ROM) storing predetermined basic data, software, etc., and a random-access memory (RAM) capable of writing temporary data. The functions of the glasses-type wearable terminal 1100 can easily be modified by rewriting initial data and software stored in the memories of the driving modules 1134. The operation button group including the switch 1142, the knob 1144, etc., further includes a power switch, etc.

The glasses-type wearable terminal 1100 may incorporate a sensor group 1152 including a plurality of sensors. The glasses-type wearable terminal 1100 may incorporate, for example, a microphone 1153, a position detection sensor 1154, a state detection sensor 1155, etc., besides the camera 1138.

The position detection sensor 1145 detects a position in a plurality of manners such as a manner of reading a bar code of a fixed position with, for example, the camera 1138 or a manner of receiving position information from a plurality of communication devices at fixed positions by the communication module 1136 to recognize the position information.

The state detection sensor 1155 comprises, for example, sensors such as an acceleration sensor, a gyroscope, etc., and detects worker's states, based on information output from the acceleration sensor and the gyroscope. The worker's states are, for example, "working" represented by "A", "moving" represented by "B", "waiting" represented by "C", "work start" represented by "D", "work end" represented by "E", etc. The worker's states are transmitted to the information management server or the system controller via the network NTW. The sensor group 1152 may also include a color sensor, a temperature sensor, a humidity sensor, a line-of-sight sensor, etc.

The communication module 1136 can establish mutual communication with the external system controller 1200 via a wireless and/or wired network.

FIG. 4B is a diagram showing an example of a specific function of the driver 1134 shown in FIG. 4A. An operation input accepter 1134a accepts an operation signal from the operation button operated by the wearer (worker) of the glasses-type wearable terminal 1100 or an operation signal received by the communication module 1136 and determines the operation content. If the operation signal is a signal which urges any display to be executed, the operation signal is input to a display controller 1134b. If the operation signal is a signal which should be transmitted to the outside, the operation signal is transmitted to the communication module 1136.

The display controller 1134b comprises a plurality of display controllers (a first display controller, a second display controller, . . . ) and can change the display data in accordance with a determination result from a determiner 1134c. The determiner 1134c comprises a plurality of determiners (a first determiner, a second determiner, . . . ) and can obtain a determination result corresponding to a detection signal from a sensor signal accepter 1134d. The sensor signal accepter 1134d accepts various types of sensor detection signals from the sensor group 1152. Various types of sensor detection signals from the sensor group 1152 may be transmitted to the system controller 1200 via the communication module 1136, based on the determination result of the determiner 1134c.

The functional blocks may be implemented by software stored in the memory of the driver 1134.

FIG. 5A shows a system operation flow of accepting work instructions via the display image of the glasses-type wearable terminal 1100 when the worker executes, for example, maintenance of a manufacturing device or repair of a broken machine. The work instruction image data is stored in, for example, the RAM of the glasses-type wearable terminal 1100. The work instruction image data read from the RAM is displayed on, for example, the image display module 1110.

For example, the worker wearing the glasses-type wearable terminal 1100 reaches a work location and, for example, presses a work start button located at the work location or makes specific gesture. Work instruction wait information (switch information or state detection information) from the glasses-type wearable terminal 1100 is thereby transmitted to the system controller 1200. The system controller 1200 receiving the work instruction wait data determines a work content (also called a work type or work name) and transmits the work start instruction data to the glasses-type wearable terminal 1100.

The work content is preliminarily divided into a plurality of work units (i.e., a plurality of segmented works), segmented work instructions are formed for the respective work units, and the segmented work instructions are prepared as instruction image data. The instruction image data may be prestored in, for example, the RAM of the glasses-type wearable terminal 1100 or may be transmitted from the system controller 1200 to the glasses-type wearable terminal 1100 for each of the segmented works. It is preferable that a work process for executing the work such as maintenance should be divided into a plurality of work units and that each work unit should be segmented in order to urge the worker to certainly execute the work. The instruction image data is a message or icon image, a moving image or a combination thereof. Alternatively, the instruction image data may be displayed as a color image.

First work start instruction data received from the system controller 1200 via the communication module 1136 is input to the operation input accepter 1134a.

Then, the operation input accepter 1134a controls the display controller 1134b, and the work instruction is thereby started. When the work instruction is started, a first work instruction is presented to the glasses-type wearable terminal 1100 by the instruction image data (step SA1). The worker understands the work instruction and starts the wok. When the worker starts the work, the work start is recognized by the glasses-type wearable terminal 1100 and the system controller 1200, based on, for example, various types of sensor outputs (step SA2).

If the work start is recognized, the glasses-type wearable terminal 1100 and/or the system controller 1200 controls the first work instruction to be non-displayed (step SA3). In other words, display of the first work instruction does not disturb the worker's work.

If an abnormal condition is detected while the worker is working (step SA4), abnormal display is executed and the flow returns to step SA1. The abnormal condition of the work is determined based on, for example, an output of an abnormal temperature detection sensor, an abnormal humidity detection sensor, an abnormal acceleration sensor, an abnormal position detection sensor, an abnormal light sensor or the like in the sensor group 1152.

When the work proceeds smoothly and the first work is completed, the first work completion is detected by the sensor (step SA5). For example, an acceleration sensor, a pressure sensor, etc., are used. When completion of the first work is detected, then a second work instruction is presented (step SA6). Then, detection of a second work start and detection of a second work end are executed, and a third work instruction is presented, similarly to the first work instruction.

When a last work instruction is presented and detection of a last work end is executed, a new next instruction is presented. The new instruction is, for example, an instruction for rest, evacuation, next work, movement to a next work location, or the like. In the present embodiment, a constituent element for executing the display control and/or a process of the display control is an important element, and enables the worker's work to be properly managed and controlled.

As explained above, the embodiment basically comprises the display module and the sensor signal acceptor which accepts a detection signal from the sensor. The first display controller urges the display module to display a first instruction for executing the first work, based on the detection signal indicating the end of the work preparation which is accepted by the sensor signal acceptor, and the second display controller urges the display module to display a second instruction for executing the second work, based on the detection signal indicating the end of the first work which is accepted by the sensor signal acceptor.

In addition, the embodiment also relates to a data processing method of the glasses-type wearable terminal comprising the driving module for processing the work instruction data. The processing method comprises urging the display module to display the first instruction for executing the first work, based on the detection signal indicating the end of the work preparation which is accepted by the sensor signal acceptor, and urging the display module to display the second instruction for executing the second work, based on the detection signal indicating the end of the first work which is accepted by the sensor signal acceptor.

A third display controller may be provided. The third display controller enables the first instruction to be non-displayed, based on the detection signal indicating the start of the first work which is accepted by the sensor signal acceptor.

Figure 5B:
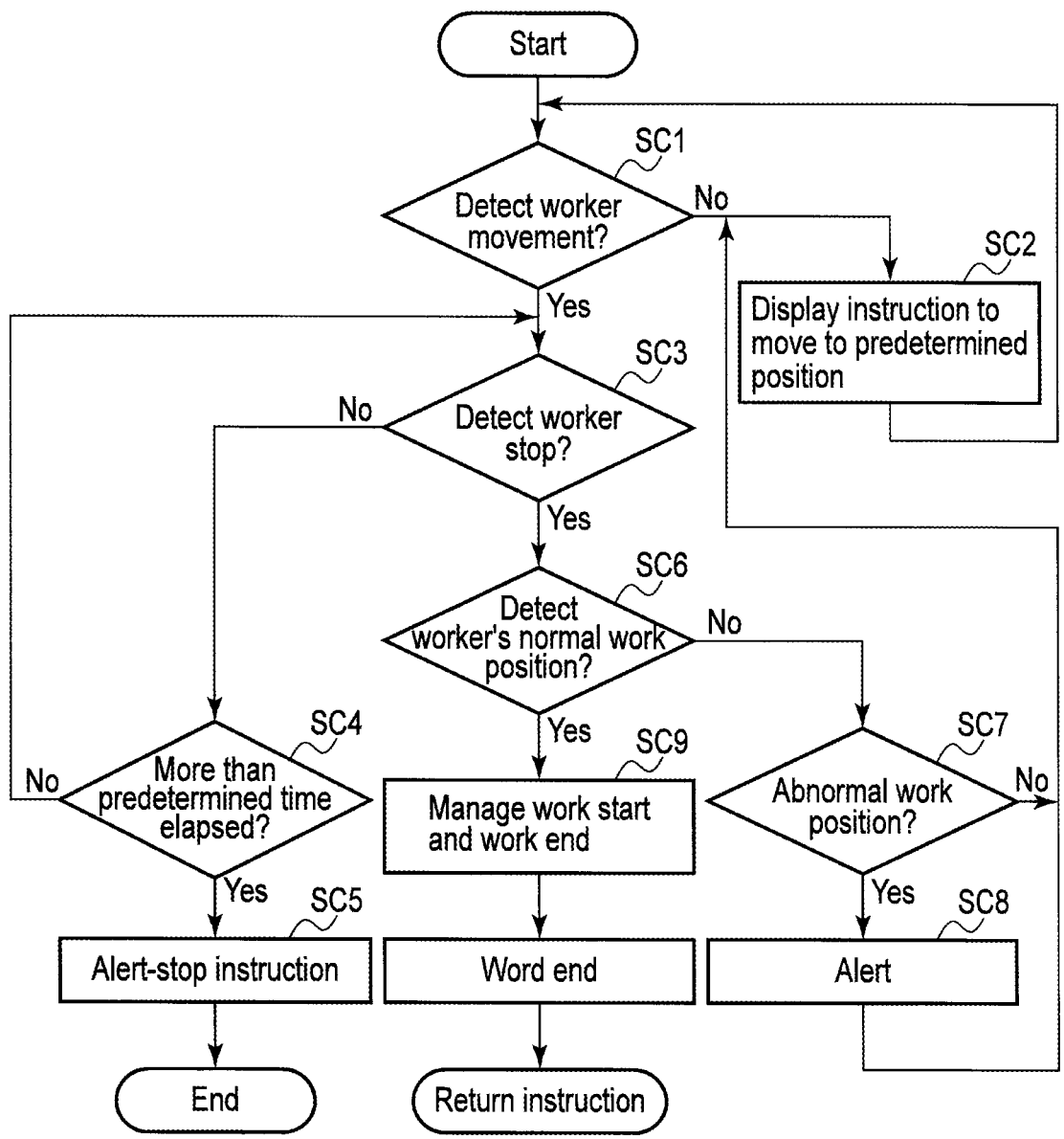
FIG. 5B is a flowchart showing another operation example of the system using the glasses-type wearable terminal of the present embodiment.

FIG. 5B is a flowchart showing yet another operation example of the system using the glasses-type wearable terminal of the present embodiment. The drawing illustrates control operations to be executed after the worker starts moving to the work location. When an instruction to move is given to the worker via the glasses-type wearable terminal 1100, the worker starts moving. The instruction to move to a predetermined position is given to the worker (step SC2). At this time, the worker's movement is detected (step SC1). An output of an attitude detector sensor such as an acceleration sensor or a gyroscope sensor is used for the worker's movement. If the worker stop is detected (step SC3), it is determined whether the worker stops at a normal position (i.e., an instructed target position) (step SC6).

If the worker does not stop after a while, it is determined whether more than a predetermined time has passed (step SC4). If the worker does not stop after more than a predetermined time, it is determined that some trouble occurs, a warning is displayed via the glasses-type wearable terminal 1100, and a stop instruction is made.

If the worker does not stop at a normal position in step SC6, it is determined that the work position is an abnormal position (step SC7), a warning is displayed via the glasses-type wearable terminal 1100, and an instruction to move to a predetermined position is displayed.

If the worker stops at the normal position, the work instruction explained with reference to FIG. 5A is started. After it is determined that the final work is ended, for example, a return instruction is displayed.

The embodiment described in the present specification does not limit the term "worker", but it may be explained as a wearer who wears the glasses-type wearable terminal. In addition, the term "work" is not limited either, and can be replaced with any terms such as action, sales, diagnosis, warning, maintenance, monitoring, and action of the wearer of the glasses-type wearable terminal.

The steps of detection, determination and display control are explained with reference to FIG. 5A and FIG. 5B. However, the blocks shown in FIG. 5A and FIG. 5B may be constituted as main hardware configuration blocks. As the basic configuration, constituent elements to execute the display control and/or steps of the display control are important elements.

Figure 6:
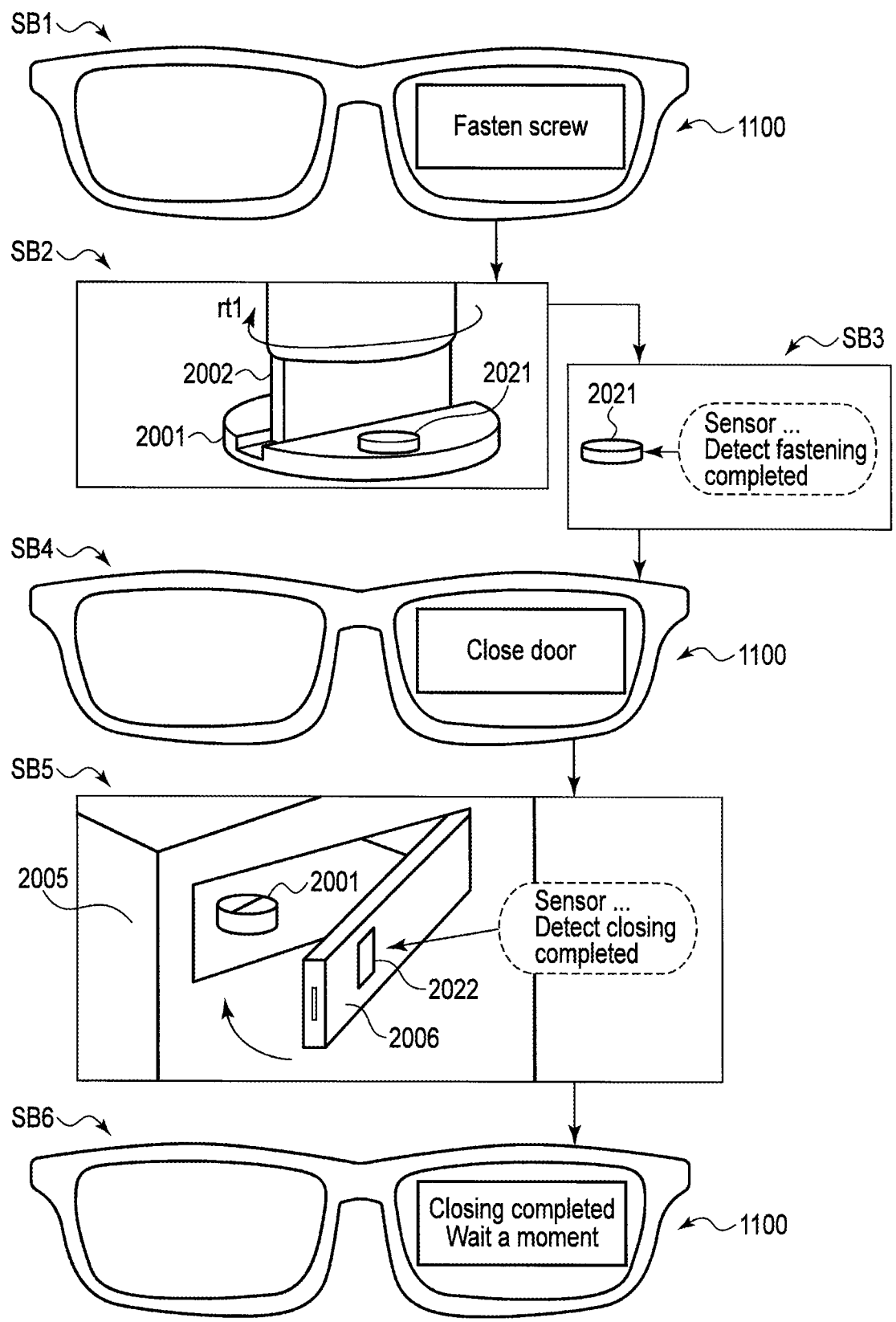
FIG. 6 is an illustration for explanation of an example of the glasses-type wearable terminal of the present embodiment in use.

FIG. 6 shows an example of the work process executed by the worker in accordance with the work instruction, together with a display example of the glasses-type wearable terminal 1100. The worker wearing the glasses-type wearable terminal 1100 is assumed to reach a work location and, for example, press a work start button located at the work location or make a specific gesture. Then, for example, communications between the glasses-type wearable terminal 110 and the system controller 1200 are started. The worker's work at a work location is assumed to, for example, tighten a screw 2001 in a housing 2005 of a manufacturing device. It is assumed that a door 2006 of the housing 2005 is opened and the opening is exposed.

When communications with the system controller 1200 are started, an instruction is transmitted to the glasses-type wearable terminal 1100 by, for example, the system controller 1200 and a display such as "Tighten the screw" is made (step SB1). The worker inserts a driver 2002 into the housing through the opening to start the operation of tightening the screw 2001. Then, a sensor (for example, the acceleration sensor) 2021 attached to the screw 2001 or the driver 2002 detects the acceleration (step SB2). Thus, when the work of tightening the screw is started, the acceleration sensor 2021 detects rotation of the screw.

Since the rotation detection signal is transmitted to the system controller 1200, the system controller 1200 recognizes that the work is started. Then, the system controller 1200 outputs a command to erase the current instruction "Tighten the screw". The work location can easily be thereby seen with the glasses-type wearable terminal 1100.

When the screw is tightened and tightening is stopped, a detection output of he sensor 2021 becomes zero. At this time, the sensor detection signal is also transmitted to the system controller 1200 via the communication module 1136. The system controller 1200 thereby determines that tightening the screw is completed (step SB3). The system controller 1200 transmits a next instruction. The next instruction is assumed to be an instruction such as "Close door" (step SB4). The worker closes a door 2006 in accordance with the instruction (step SB5). At this time, i.e., when the door 2006 is rotated in a closing direction, a sensor (for example, an acceleration sensor) 2022 detects the rotation start of the door 2006. At this time, the detection signal is transmitted to the system controller 1200 via the communication module 1136. The system controller 1200 thereby detects the rotation start of the door 2006. When the door 2006 is closed and the rotation is stopped, the sensor (for example, the acceleration sensor) 2022 detects the stop of the door 2006 (i.e., closing of the door 2006). At this time, the sensor detection signal is also transmitted to the system controller 1200 via the communication module 1136. The system controller 1200 thereby determines that closing the screw is completed (step SB5). A next instruction is transmitted to the glasses-type wearable terminal 1100. For example, the system controller 1200 transmits an instruction such as "Closing door is completed. Please wait" (step SB6).

As explained, a plurality of segmented works are executed serially and detection of the start and end of each segmented work is executed. For this reason, each work is executed certainly, and the work can be prevented from being not executed (i.e., for getting the work steps can be prevented), and the work can be prevented from being incomplete. As a result, safety of a device serving as a work target (a manufacturing device, a conveying device or the like) and safety of a manufactured item, a conveyed item or the like can be secured.

As shown in FIG. 7A to FIG. 7D, if an instruction based on the image data is displayed on the glasses-type wearable terminal 1100, a method of producing the instruction and a method of acquiring the image data can be implemented by various embodiments.

Figure 7A:
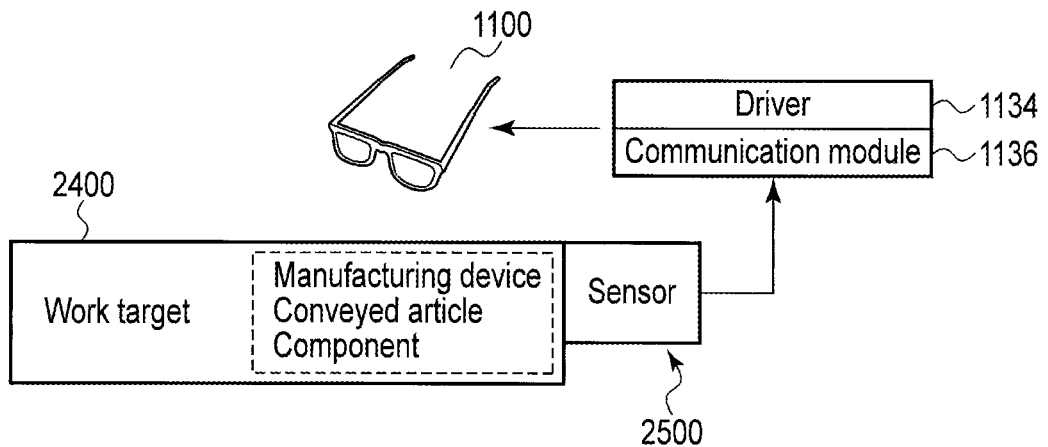
FIG. 7A is an illustration showing an example of a communication system using the glasses-type wearable terminal of the present embodiment for maintenance of, for example, a work.

FIG. 7A shows an example of mounting a sensor 2500 on a work target (a manufacturing device, a conveyed article, a component or the like) 2400. In this example, a movement (work start and work completion) detection signal of the work target is output from the sensor 2500 mounted on the work target 2400. In addition, various types of instruction image data are stored in the memories in the driver 1134 of the glasses-type wearable terminal 1100. The embodiment is useful when communications between the glasses-type wearable terminal 1100 and the system controller 1200 are difficult.

Figure 7B:
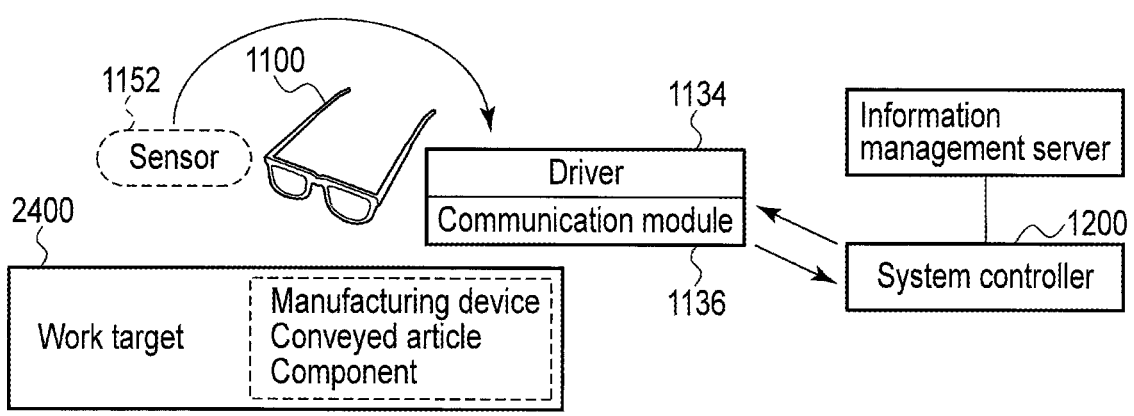
FIG. 7B is an illustration showing another example of a communication system using the glasses-type wearable terminal of the present embodiment for maintenance of, for example, a work.

FIG. 7B shows the embodiment available when a sensor is not mounted on the work target 2400. In the present embodiment, the sensors mounted on the glasses-type wearable terminal 1100 is effectively utilized. For example, the camera, the temperature sensor, the humidity sensor, the light sensor, the sight sensor, the color sensor, etc., are effectively utilized. The glasses-type wearable terminal 1100 can transmit the detection signals from the sensors to the system controller 1200. The system controller 1200 determines the instruction content which should be transmitted to the glasses-type wearable terminal 1100 in accordance with the detection signals of the sensors, and transmits the instruction data to the glasses-type wearable terminal 1100. The glasses-type wearable terminal 1100 can transmit determine the image data which should be displayed, speech which should be produced, etc., in accordance with the instruction data, and supply the work instruction to the worker (wearer).

Figure 7C:
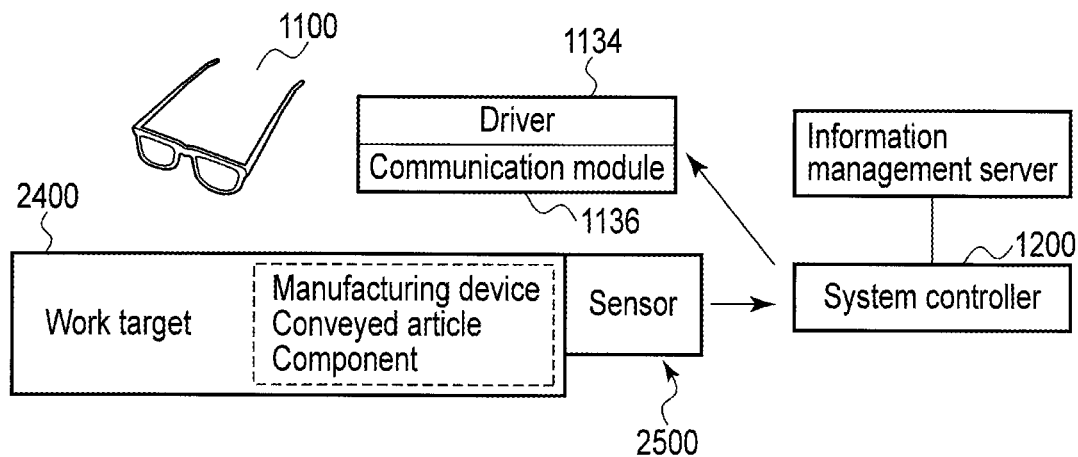
FIG. 7C is an illustration showing yet another example of a communication system using the glasses-type wearable terminal of the present embodiment for maintenance of, for example, a work.

FIG. 7C shows an example of mounting the sensor 2500 on the work target (a manufacturing device, a conveyed article, a component or the like) 2400. In the present embodiment, the sensor 2500 establishes communications with the system controller 1200, and the system controller 1200 transmits instruction data to the glasses-type wearable terminal 1100. According to the present embodiment, the system controller 1200 can recognize a progress of work of a first set of the work target 1400 and the glasses-type wearable terminal 1100 at any time. In addition, the system controller 1200 can also recognize a progress of work of second set of the other work target and the glasses-type wearable terminal. As a result, the system controller 2400 can also adjust the proceeding of work of the first set and the second set. For example, instructions of contents indicating "Suspend work", "Hurry work", etc., can be issued.

Figure 7D:
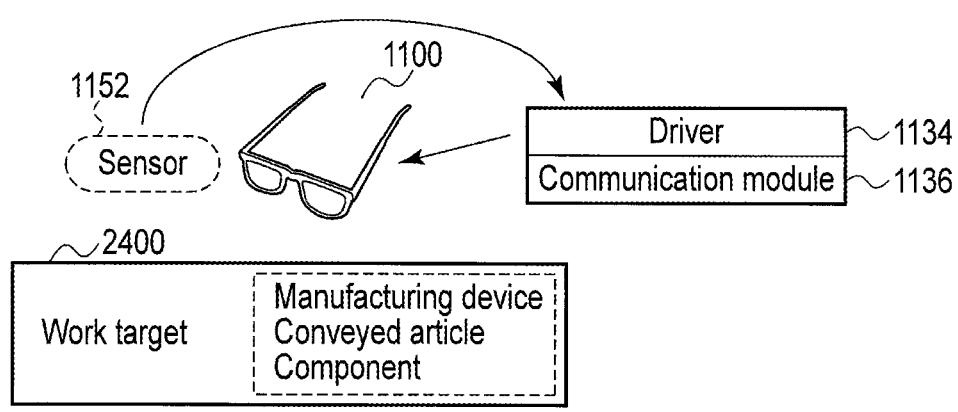
FIG. 7D is an illustration showing yet another example of a communication system using the glasses-type wearable terminal of the present embodiment for maintenance of, for example, a work.

FIG. 7D shows the embodiment available when a sensor is not mounted on the work target 2400. In the present embodiment, the sensors mounted on the glasses-type wearable terminal 1100 is effectively utilized. The present embodiment is useful when communications between the glasses-type wearable terminal 1100 and the system controller 1200 are difficult. The glasses-type wearable terminal 1100 incorporates, for example, the camera, the temperature sensor, the humidity sensor, the light sensor, the sight sensor, the color sensor, etc., which are effectively utilized. In the present embodiment, various types of instruction image data for conducting work instructions are stored in the memories of the glasses-type wearable terminal 1100. The next work instruction image data is selected in accordance with the detection signals of the sensors, and displayed on the display module of the glasses-type wearable terminal 1100.

The embodiments shown in FIG. 7A to FIG. 7D may be combined. Alternatively, operation modes shown in FIG. 7A to FIG. 7D may be changed in accordance with a mode change signal.

Figure 8:
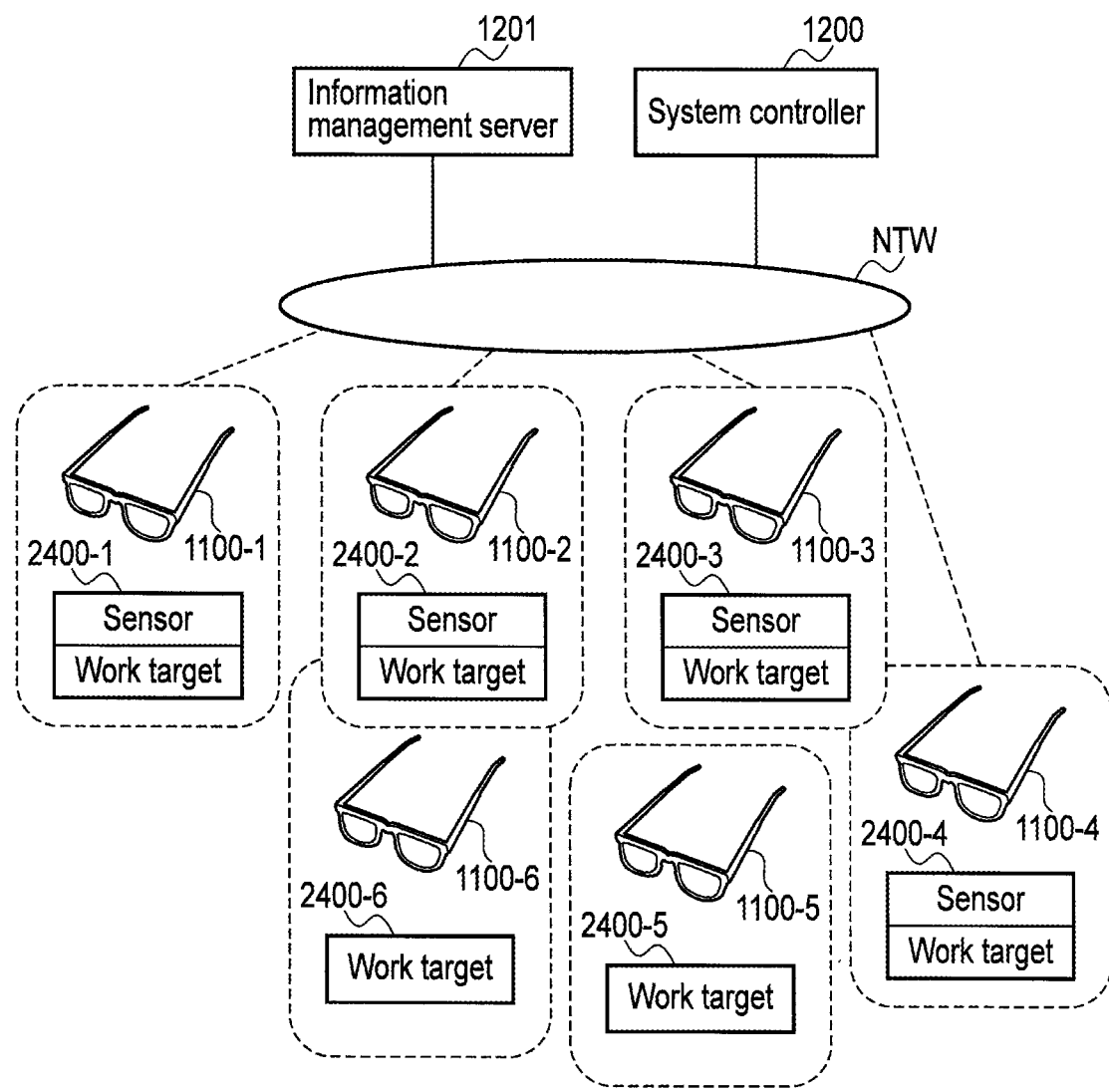
FIG. 8 is an illustration showing an example of a state in which the glasses-type wearable terminal of the present embodiment is used at a work location.

FIG. 8 shows an example of a state in which the glasses-type wearable terminal of the present embodiment is used at a work location. A set of a glasses-type wearable terminal 1100_1 and a work target 2400_1 adopts the communication mode as explained with reference to FIG. 7A or FIG. 7C. In addition, a set of a glasses-type wearable terminal 1100_2 and a work target 2400_2, a set of a glasses-type wearable terminal 1100_3 and a work target 2400_3, and a set of a glasses-type wearable terminal 1100_4 and a work target 2400_4 also adopt the communication mode as explained with reference to FIG. 7A or FIG. 7C. A set of a glasses-type wearable terminal 1100_5 and a work target 2400_5 and a set of a glasses-type wearable terminal 1100_6 and a work target 2400_6 adopt the communication mode as explained with reference to FIG. 7B or FIG. 7D.

The system controller 1200 can establish communications with each of the glasses-type wearable terminals 1100_1 to 1100_6 and can update the data, and update and rewrite the software in the memories of each terminal. An information management server 1201 stores previous work achievement, data on a check result of each work target, instruction image data on each work target, etc. The system controller 1200 can read the data of the information management server 1201 and transmit the data to the glasses-type wearable terminals as needed. In addition, the system controller 1200 can also transmit the data transmitted from the glasses-type wearable terminals and the sensors of the work targets to the information management server 1201 as storage data.

As explained above, the sensor signal acceptor of the glasses-type wearable terminal can accept sensor signals from a plurality of sensors. The sensor signal acceptor may accept sensor signals from a plurality of sensors mounted on the main body of the glasses-type wearable terminal. Furthermore, the sensor signal acceptor may accept sensor signals from a plurality of external sensors via the antenna. In addition, the glasses-type wearable terminal may comprise a memory and produce first and second instructions, based on data stored in the memory. In addition, the glasses-type wearable terminal may be designed to comprise an antenna and accept the first and second instructions from an external management module via the antenna.

Figure 9:
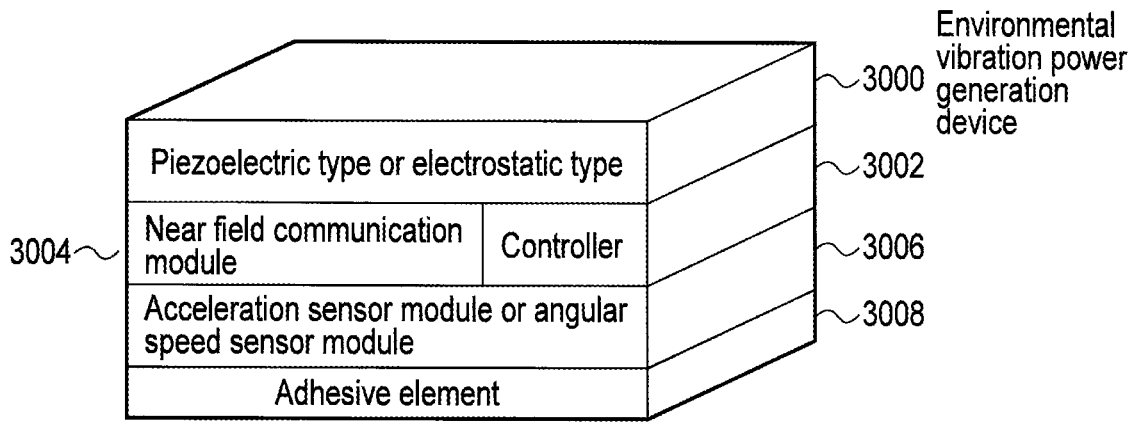
FIG. 9 is an illustration showing a detailed structure of a sensor detecting and notifying a work end state.

FIG. 9 shows a detailed structure inside the sensor. The sensor 2021 or 2022 which detects completion of the worker's predetermined work at the work location, etc., has a structure enabling the sensor to be additionally installed at an existing device (corresponding to the screw 2001 or the door 2006 in FIG. 6) in the existing environment or production facilities.

One of methods for automatically detecting completion of the worker's work is a method of replacing the existing device with a new producing device which preliminarily incorporates a plurality of sensors 2021 and 2022 capable of detecting a predetermined work completion state. In this method, however, much investment costs are required for the device replacement. In contrast, if a method of additionally installing the sensors 2021 and 2022 which are at very low costs themselves in an existing environment or an existing device is adopted, an effect of automatically detecting the worker's work completion state at very low costs can be obtained.

As the method of additionally installing the sensors 2021 and 2022, an adhesive element 3008 is formed at a contact portion between the sensors 2021, 2022 and the existing environment or the existing device, in the embodiment shown in FIG. 9. More specifically, the adhesive element 3008 at the portion which is in contact with the existing environment or the existing device may be constituted by, for example, an adhesive sheet having a great strength. In this case, a cover sheet is preliminarily attached to the portion of the adhesive element 3008 in contact with the existing environment or the existing device when the sensor 2021 or 2022 is shipped, and the cover sheet is detached at the installation place of the sensor 2021 or 2022 to allow the adhesive element 3008 to directly adhere to the existing environment or the existing device. In addition to this, the adhesion property (or the bonding property) may not be preliminarily imparted to the portion of the adhesive element 3008 in contact with the existing environment or the existing device, but the portion of the adhesive element 3008 which is in direct contact with the existing environment or the existing device may be impregnated with a bonding agent and adhered when the sensor 2021 or 2022 is installed. Furthermore, the sensor 2021 or 2022 may be fixed to the existing environment or the existing device by screws, etc., by using the adhesive element 3008 at the portion which is in contact with the existing environment or the existing device, as the other method of additionally installing the sensor 2021 or 2022.

In the structure shown in FIG. 9, an acceleration sensor module or the angular speed sensor module 3006 is arranged to be adjacent to the adhesive element 3008 at the portion in contact with the existing environment or the existing device. The acceleration sensor module or angular speed sensor module 3006 arranged more closely to the existing environment or the existing device surface at which the sensors should be additionally installed can detect the acceleration or the angular speed of the existing device or the existing environment more exactly. Thus, as shown in FIG. 9, the effect of detecting the acceleration or the angular speed of an target object (corresponding to the screw 2001 or the door 2006 in FIG. 6) more exactly can be obtained by arranging the acceleration sensor module or angular speed sensor module 3006 at the position more closely to the device (or environmental object) at which the sensors should be additionally installed than to a controller 3002, a near field communication module 3004 or an environmental vibration power generation device 3000.

In the present embodiment, a low G acceleration sensor having a measurement range below 20 G (where 1 G represents the gravitational acceleration of the Earth) is used as the acceleration sensor. When the sensor is used as the acceleration sensor, an outer wall portion of the acceleration sensor module or angular speed sensor module 3006 constitutes a fixing module, and a sensor element moving module is installed in the fixing module (inside the acceleration sensor module or angular speed sensor module 3006), but a detailed internal structure of the moving module is not shown in FIG. 9. The acceleration is detected with variation in the position of the sensor element moving module to the fixing module. In the present embodiment, either the electrostatic capacitance detection type (for detecting the electrostatic capacitance variation between the fixing module and the sensor element moving module) or the piezoresistance type (for detecting distortion at a sprig portion by using a piezoresistive element arranged at a spring portion connecting the fixing module and the sensor element moving module) may be applied.

In addition, in the present embodiment, the vibration type using the Micro Electro Mechanical System (MEMS) technology may be used as the angular speed (gyroscope sensor). Similarly to the above-explained acceleration sensor, a basic structure of the angular speed (gyroscope sensor) is constituted by a fixing module composed of the outer wall portion of the acceleration sensor module or angular speed sensor module 3006 and a sensor element moving module installed in the fixing module (inside the acceleration sensor module or angular speed sensor module 3006). A plurality of first and second comb electrodes arranged orthogonally to each other are arranged inside the fixing module. The voltage is alternately applied to the first comb electrodes to vibrate the sensor element moving module in a certain cycle. When the acceleration sensor module or angular speed sensor module 3006 is rotated, the sensor element moving module relatively makes a rotational movement to the fixing module. Next, the angular speed is detected by recognizing the rotary displacement as variation in the capacitance by the second comb electrodes. Incidentally, the angular sensor (gyroscope sensor) of not only the above-explained mechanical system, but also a geomagnetic type, an optical type or a mechanical type may be used in the present embodiment.

Data based on the acceleration or the angular speed detected in the above-explained manner is transmitted to the system controller 1200 (see FIG. 7) via the near field communication module 3004. Signal processing of the signal from which the data is obtained from operation control of the near field communication module 3004 or from the acceleration sensor module or angular speed sensor module 3006 is executed inside the controller 3002. An effect of lowering the position of the sensor 2021 or 2022 can be obtained by arranging the near field communication module 3004 and the controller 3002 in the same row as shown in FIG. 9.

In the present embodiment, as shown in FIG. 9, feed of the power (power supply) necessary for operations of the acceleration sensor module or angular speed sensor module 3006 and the near field communication module 3004 and the controller 3002 is executed by the environmental vibration power generation device (of the piezoelectric type or the electrostatic type) 3000. If a cable is used for the power supply (power feed) to the sensor 2021 or 2022, change of interconnects becomes complicated every time the installation position of the sensor 2021 or 2022 is changed. In addition, if replaceable batteries are used as the power supply (power feed) and a number of sensors 2021 or 2022 are installed, a problem arises that battery replacement becomes very complicated. In the present embodiment, energy of the acceleration and the angular speed to be detected is used as the power supply (power feed) by taking advantage of the characteristic of the sensor 2021 or 2022 of detecting the acceleration and the angular speed. As a result, since the power feed using cables is unnecessary, an effect of eliminating not only complication in the change of interconnects caused by the change of installation position of the sensor 2021 or 2022, but complication in the battery replacement can be obtained.

In general, when an earthquake occurs, an upper position of a tall building shakes more radically than an interior of a one-storied building. Thus, in a structure protruding from a vibration surface, a greater vibration occurs at a position remote from the vibration surface (i.e., the vibration amplitude is great). In the present embodiment using this phenomenon, the environmental vibration power generation device 3000 is arranged at a position farthest from the adhesive element 3008 at the portion which is in contact with the existing environment or the existing device, as shown in FIG. 9. In other words, the environmental vibration power generation device 3000 is arranged at the position farther from the adhesive element 3008 at the portion which is in contact with the existing environment or the existing device, than from the acceleration sensor module or angular speed sensor module 3006 and the near field communication module 3004 and the controller 3002. An effect of maximizing the efficiency in power generation can be thereby obtained.

Figure 10:
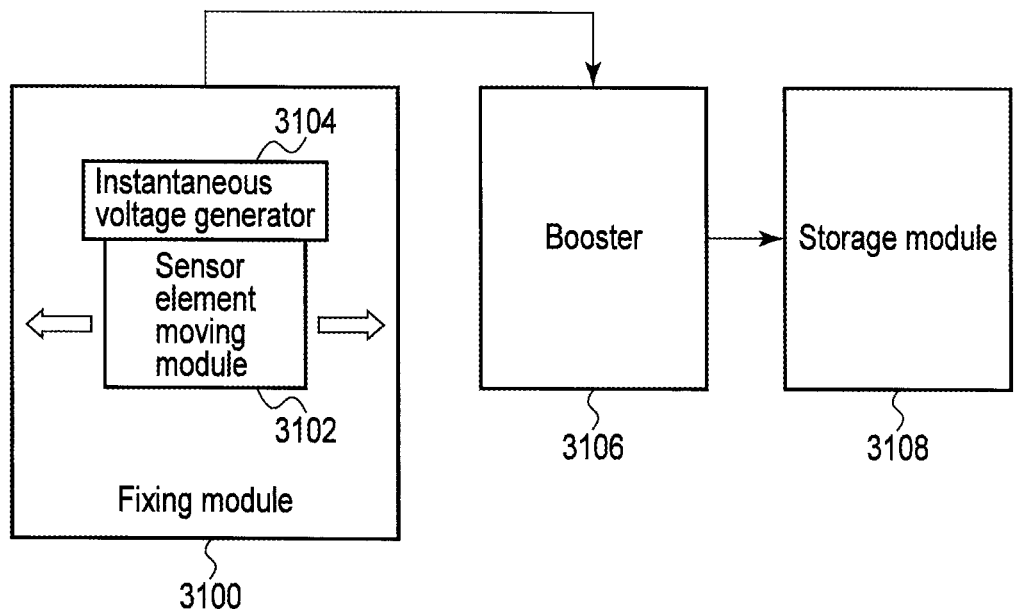
FIG. 10 is a diagram for explanation of a basic structure of an environmental vibration power generation device.

FIG. 10 shows a basic structure inside the environmental vibration power generation device 3000 shown in FIG. 9. A part of this structure is similar to the basic structure of the acceleration sensor or the angular speed sensor. In other words, an interior of the environmental vibration power generation device 3000 is composed of a fixing module 3100 and a sensor element moving module 3102, and the sensor element moving module 3102 is movable to the fixing module 3100 in response to an external environmental vibration.

In addition, an instantaneous voltage generator 3104 which is movable synchronously with the movement of the sensor element moving module 3102 is formed to generate an instantaneous voltage in accordance with the movement of the sensor element moving module 3102. A type of using a piezoelectric element, of the instantaneous voltage generator 3104, is called "piezoelectric" and a type of using an electric (i.e., an insulator having a semipermanent charge), of the instantaneous voltage generator 3104, is called "electrostatic".

The instantaneous voltage generated by the instantaneous voltage generator 3104 is converted into a direct current, smoothed, and boosted by a booster 3106. An output power of the booster 3106 is stored in a storage module 3108.

A specific operation principle in the environmental vibration power generation device 3000 shown in FIG. 10 will be explained with reference to FIG. 11 to FIG. 15. When the instantaneous voltage generator 3104 of the piezoelectric type or the electrostatic type is adopted, the devices subsequent with the booster 3106 can be used commonly as shown in FIG. 11 to FIG. 15. Thus, the principle of power storage of both the piezoelectric type and the electrostatic type will be explained in FIG. 11 to FIG. 15. When the piezoelectric type is adopted, an output from a piezoelectric element 3130 is linked to an input terminal 3116 side. When the electrostatic type is adopted, an output from a metal electrode substrate 3138 is linked to the input terminal 3116 side.

In other words, in the piezoelectric type, as shown in FIG. 11 to FIG. 15, a connector which links the fixing module 3100 and the sensor element moving module 3102 corresponds to the instantaneous voltage generator 3104, and the piezoelectric element 3130 is installed in the connector. If the sensor element moving module 3102 is greatly shifted from a neutral position with respect to the fixing module 3100, an electromotive voltage is generated between both sides of the piezoelectric element 3130. Conversely, if the sensor element moving module 3102 returns to a neutral position, an electromotive voltage between both sides of the piezoelectric element 3130 is reduced.

In addition, an electric member 3134 is installed in the fixing module 3100, in the electrostatic type, as shown in FIG. 11 to FIG. 15. The electric indicates an insulator having a semipermanent charge, and cytop or the like can be used as a specific material. In the embodiment shown in FIG. 11 to FIG. 15, a surface of the electric member 3134 is charged with negative charge at any time. An electric electrode substrate 3132 is connected to the electric member 3134, and a relative potential of the electric member 3134 is held at 0V at any time. A movable counter-electrode 3136 is installed near the negatively charged electric member 3134. The instantaneous voltage is generated by allowing the counter-electrode 3136 to move to the electric member 3134. The counter-electrode 3136 is therefore installed in the instantaneous voltage generator 3104 explained with reference to FIG. 10. In addition, the metal electrode substrate 3138 is connected to the counter-electrode 3136, and charges are supplied to the counter-electrode 3136 via the metal electrode substrate 3138. The metal electrode substrate 3138 is therefore contained in the sensor element moving module 3102 explained with reference to FIG. 10. The sensor element moving module 3102 or the instantaneous voltage generator 3104 is constituted by a combination of the metal electrode substrate 3138 and the counter-electrode 3136. An absolute value of the amount of negative charges on the surface of the electric member 3134 needs to match an amount of positive charges on the counter surface in the counter-electrode 3136 in close vicinity, based on a theory of electromagnetic capacitor. Thus, when the position of the counter-electrode 3136 corresponds to the position of the electric member 3134, the most amount of positive charges is accumulated on the counter surface in the counter-electrode 3136. Conversely, if the position of the counter-electrode 3136 is greatly displaced from the position of the electric member 3134, the amount of positive charges accumulated on the counter surface in the counter-electrode 3136 becomes small. The positive charges accumulated on the counter surface is moved to the other location via the metal electrode substrate 3138.

A signal detector 3110 is arranged at a voltage output terminal of the instantaneous voltage generator 3104 in FIG. 11 to FIG. 15, but is not shown in FIG. 10. The acceleration and the angular speed can be detected by using the output from the signal detector 3110. More specifically, a resistor 3120 is installed in the signal detector 3110, and the instantaneous voltage generated by the instantaneous voltage generator 3104 flows inside the resistor 3120. When the current flows inside the resistor 3120, the voltage is instantaneously generated on both sides of the resistor 3120. Variation in instantaneous current from the outside can be monitored by buffering the instantaneous voltage by a differential buffer amplifier 3112.

In FIG. 11 to FIG. 15, a Cockcroft-Walton circuit is explained as an example of the booster 3106, but at least a circuit capable of rectifying or smoothing the current or amplifying the voltage may be used instead. A capacitor element 3128 is explained as an example of the interior of the storage module 3108, but a repeatedly chargeable and dischargeable battery may be used instead.

Figure 11:
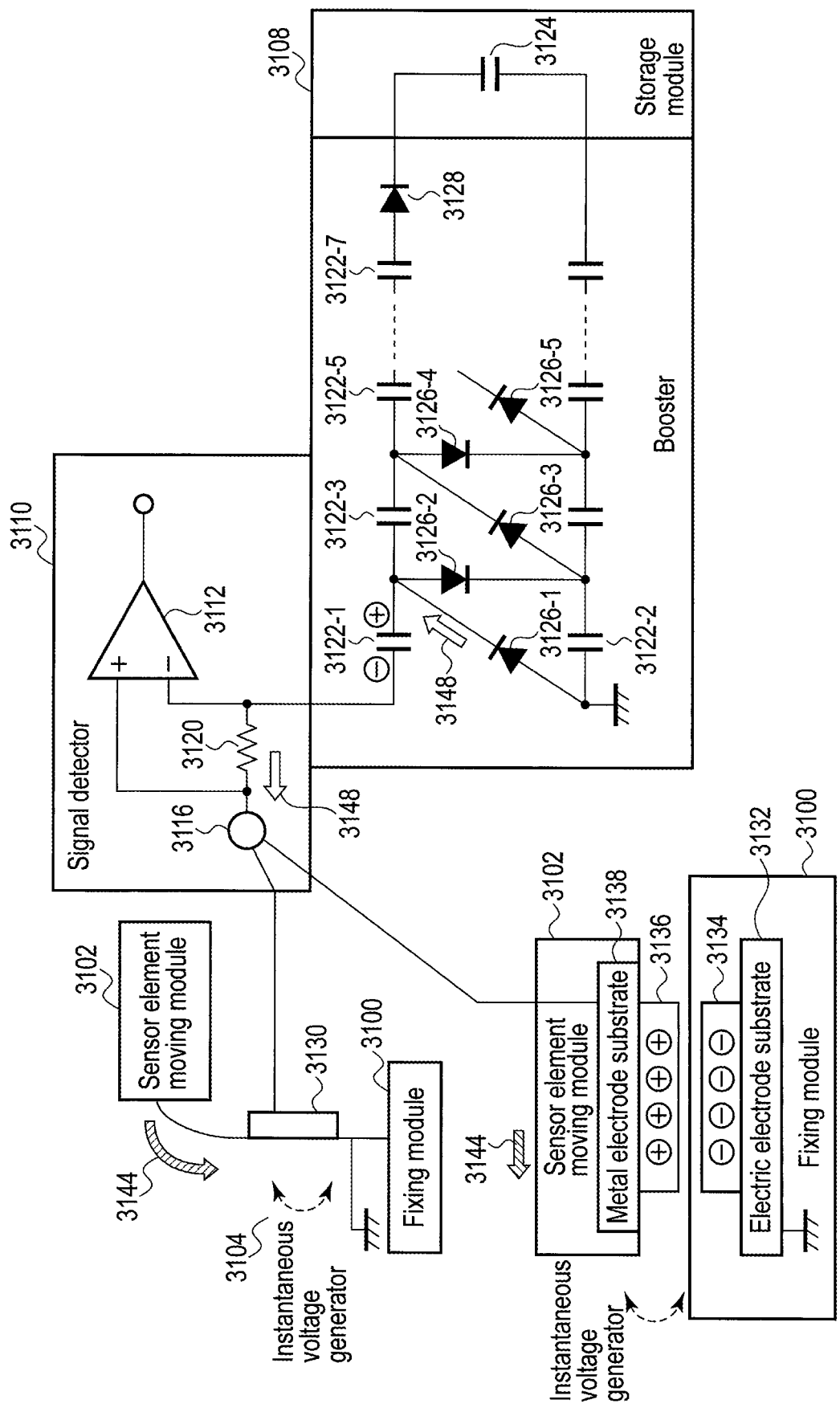
FIG. 11 is an illustration (1) of a principle of power storage in the environmental vibration power generation device.

In FIG. 11 to FIG. 15, a shaded arrow 3114 represents a direction of movement of the sensor element moving module and a hollow arrow 3142 represents a current direction. If the sensor element moving module 3102 moves to the left side as shown in FIG. 11, the electromotive voltage between inner terminals (surfaces) of the piezoelectric element 3130 becomes small since a distortion amount of the piezoelectric element 3130 becomes small. Thus, reduced positive charges flow from the input terminal 3116 to the piezoelectric element 3130. The left side and the right side indicate directions on sheets of drawings.

In the electrostatic type, if the position of the counter-electrode 3136 is moved to the left side, the amount of positive charges deposited on the surface of the counter-electrode 3136 is increased, and the deposited positive charges flow into the input terminal 3116 via the metal electrode substrate 3138. As a result, a current 3148 flows from the right side to the left side, inside the resistor 3120, in both the piezoelectric and electrostatic types. Since the positive charges are supplied from the left electrode of a capacitor element 3122-1, the left electrode is charged with negative charges after the supply. Then, the current 3148 flows to the right electrode of the corresponding capacitor element 3122-1 via a diode element 3126-1 to supply positive charges, based on the theory of electromagnetic capacitor. As another explanation, when the sensor element moving module 3102 moves to the left side in a case where charges are not stored on both electrodes of the capacitor element 3122-1, both the electrodes are simultaneously at the negative potential, and the current 3148 flows to the right electrode of the capacitor element 3122-1 via the diode element 3126-1.

Figure 12:
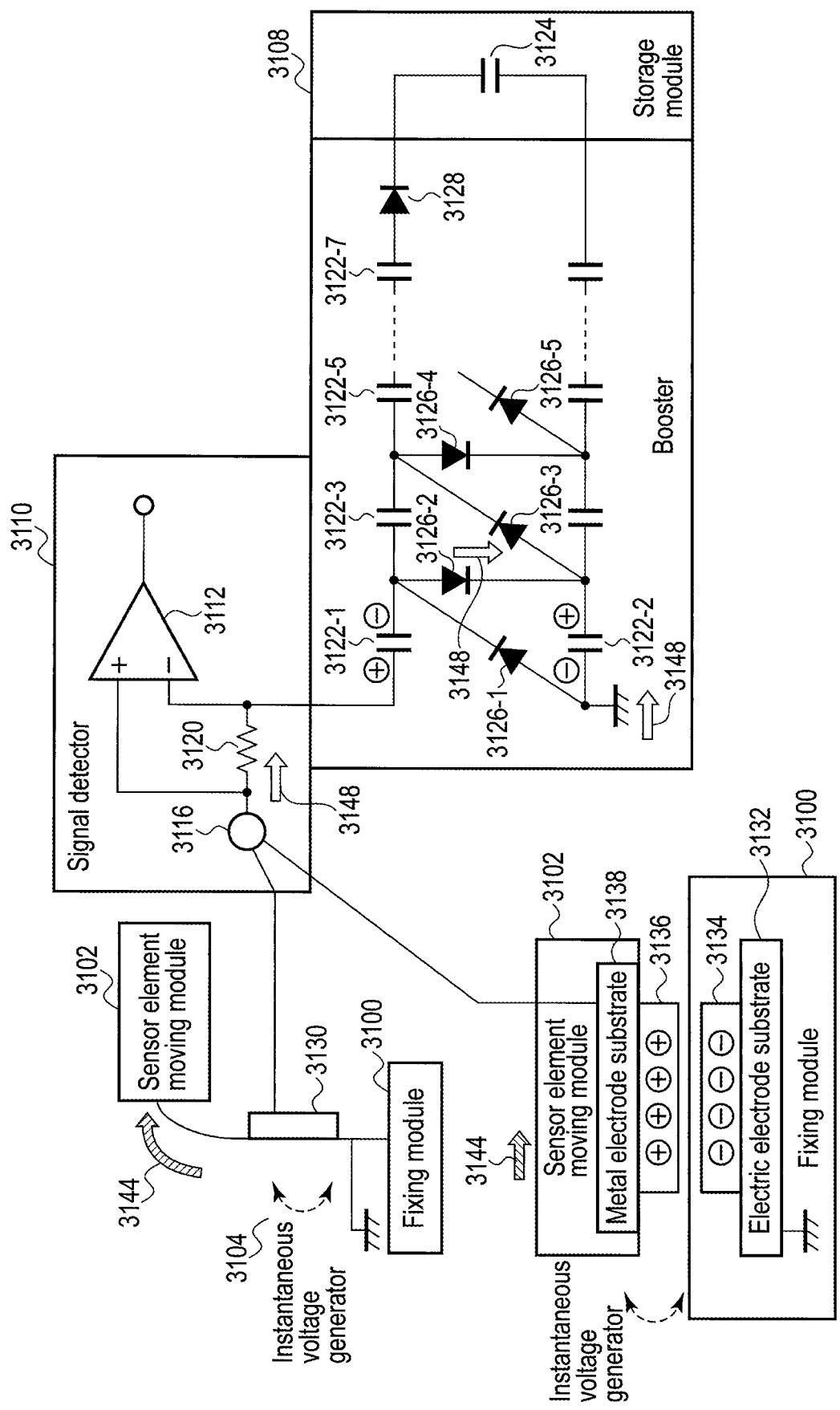
FIG. 12 is an illustration (2) of the principle of power storage in the environmental vibration power generation device.

If the sensor element moving module 3102 moves to the right side immediately after that as shown in FIG. 12, the electromotive force on both sides of the piezoelectric element 3130 is increased and the current flows from the left side to the right side inside the resistor 3120, in the piezoelectric type. In addition, in the electrostatic type, since the position of the counter-electrode 3136 is shifted more greatly with respect to the position of the electric member 3134, the current flows from the left side to the right side inside the resistor 3120 to reduce the amount of positive charges deposited on the surface of the counter-electrode 3136. At this time, positive charges stored at the right electrode of the capacitor element 3122-1 move to a right electrode of a capacitor element 3122-2 via a diode element 3126-2. To eliminate the positive charges, negative charges are stored in a left electrode of the capacitor element 3122-2. This phenomenon can also be explained in the following manner. When the sensor element moving module 3102 moves to the right side, the right side of the resistor 3120 becomes at the positive potential, the potential of the right electrode of the capacitor element 3122-1 becomes very high in the charge distribution inside the capacitor element 3122-1 shown in FIG. 11, and the current 3148 flows through the inside of the diode element 3126-2. As a result, the positive charges are stored in the right electrode of the capacitor element 3122-2 and the negative charges are stored in the left electrode of the capacitor element 3122-2.

Figure 13:
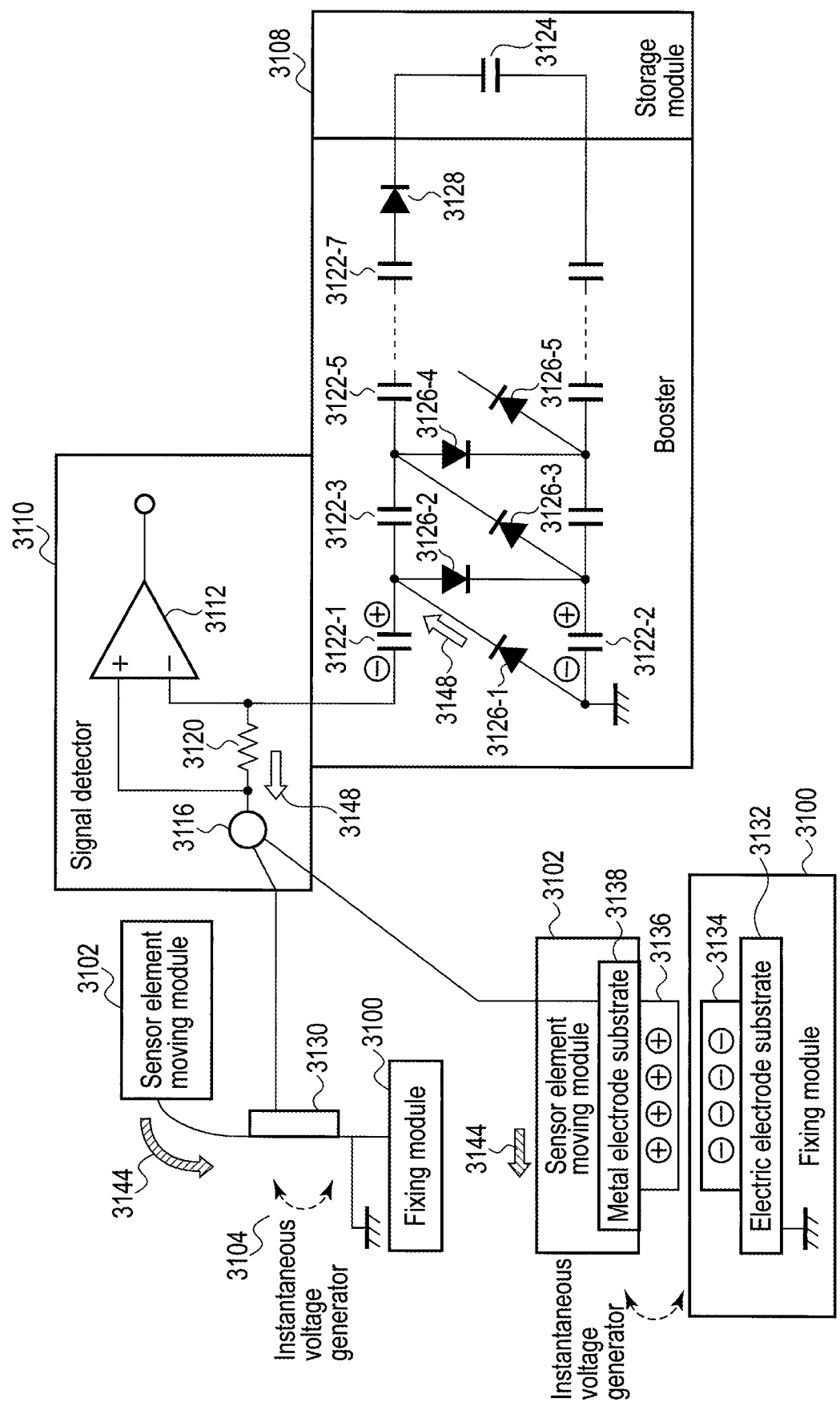
FIG. 13 is an illustration (3) of the principle of power storage in the environmental vibration power generation device.

After that, when the sensor element moving module 3102 returns to the left side as shown in FIG. 13, the current 3148 flows from the right side to the left side, inside the resistor 3120. At this time, if the charge distribution in the electrodes at both sides of the capacitor element 3122-1 remains as shown in FIG. 12, the potential of the right electrode of the capacitor element 3122-2 becomes very low. As a result, the current 3148 flows to the right electrode of the capacitor element 3122-1 via the diode element 3126-1, and the positive charges are stored in the right electrode of the capacitor element 3122-1. Simultaneously, the current flows from the left electrode of the capacitor element 3122-1 to the instantaneous voltage generator 3104 via the resistor 3120. As a result the negative charges are stored in the left electrode of the capacitor element 3122-1.

Figure 14:
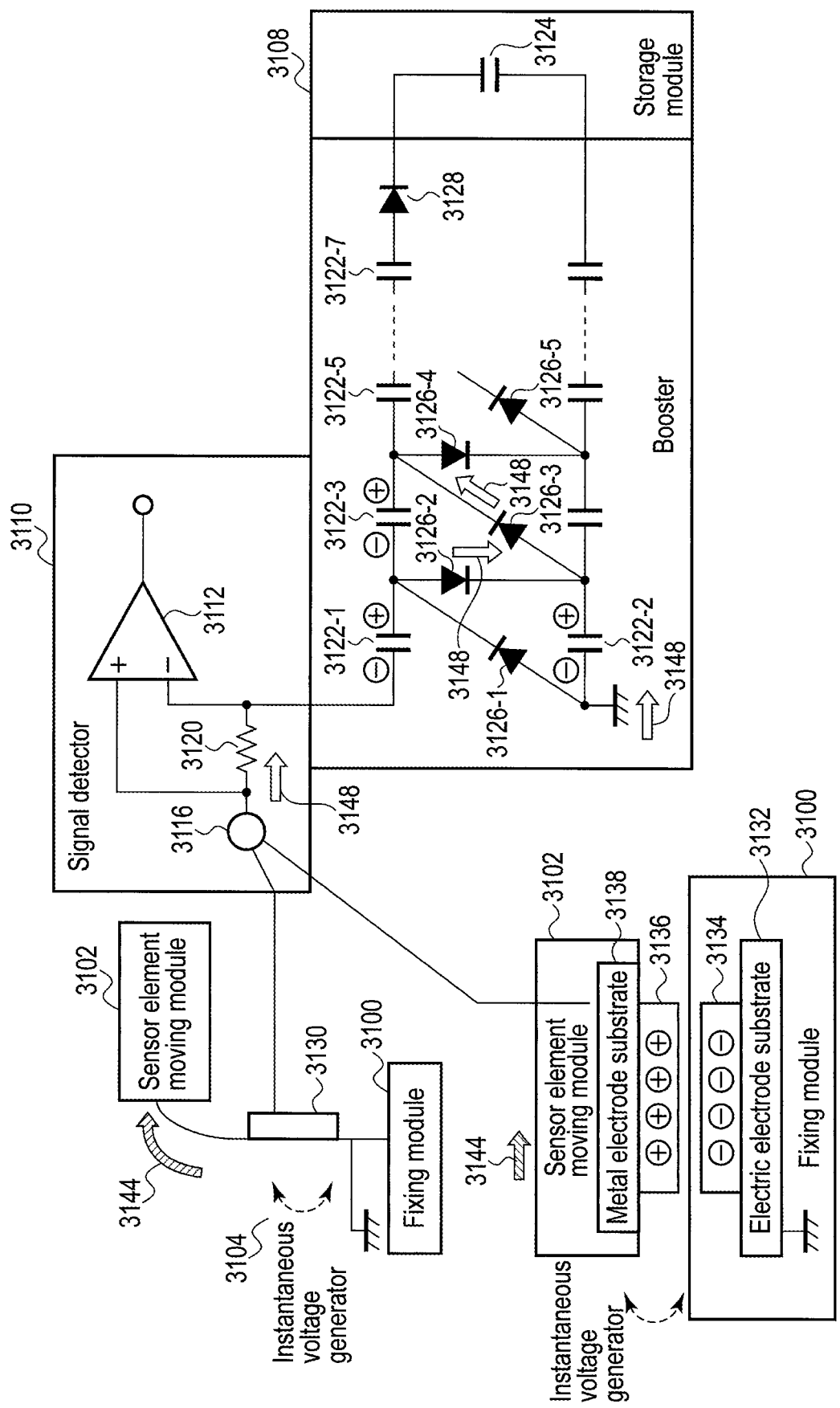
FIG. 14 is an illustration (4) of the principle of power storage in the environmental vibration power generation device.

FIG. 14 shows a circumstance in which the sensor element moving module starts moving to the right side. The current 3148 starts flowing from the left side to the right side inside the resistor 3120 when the movement starts, and the charge distribution on both sides of the capacitor element 3122-1 indicates a moment at which the state shown in FIG. 13 is held. In this case, since the potential at the right electrode of the capacitor element 3122-1 becomes very high, the current starts flowing from the right electrode of the capacitor element 3122-1 to the right electrode of the capacitor element 3122-3 via diode elements 3126-2 and 3126-3. As shown in FIG. 15 as its result, the charge distribution is generated in the electrodes at both sides of the capacitor element 3122-3 (i.e., the voltage is generated/held at both ends of the capacitor element 3122-3). The voltage is thus sequentially stored on both sides of capacitor elements 3122-2 to 3122-8.

Figure 16:
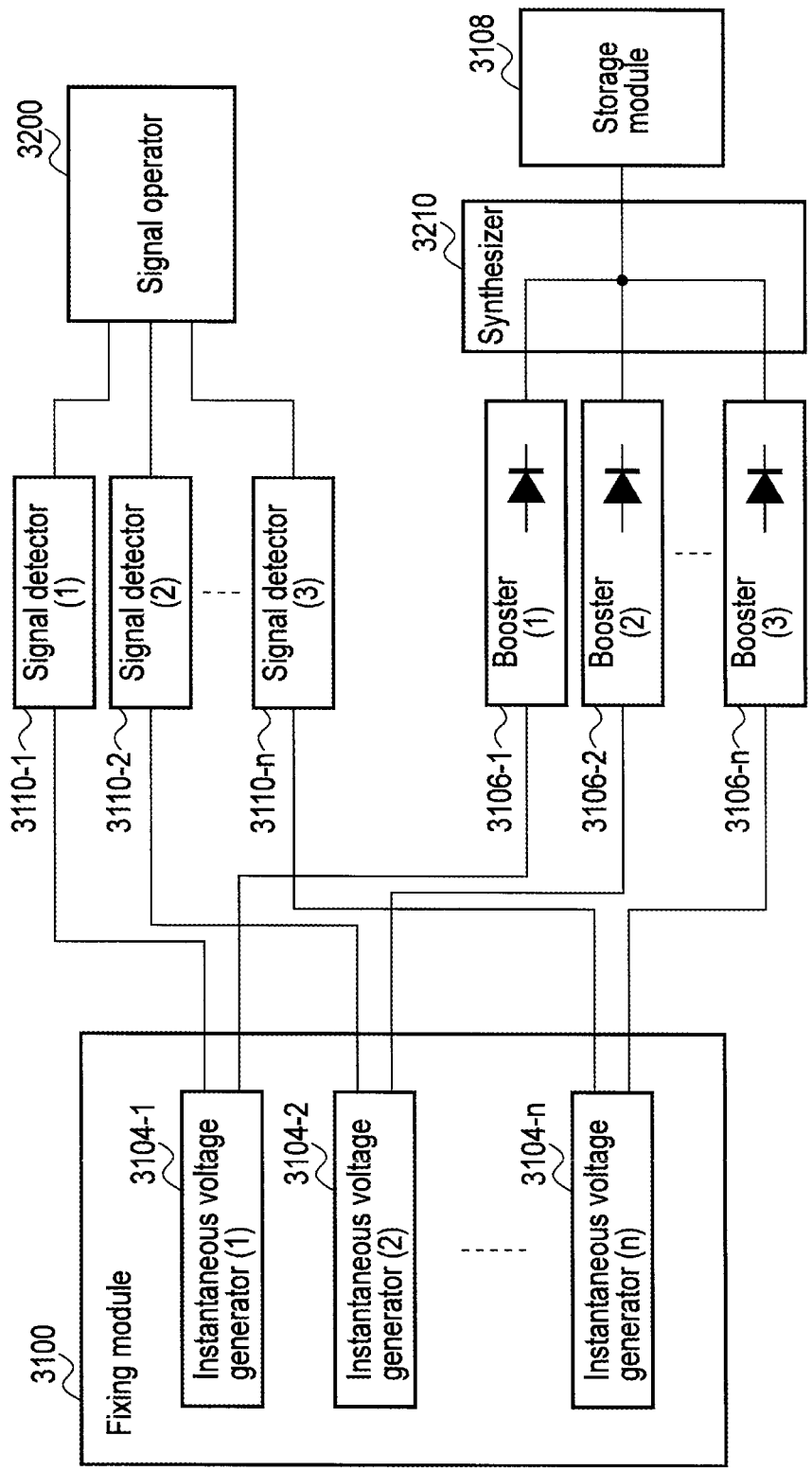
FIG. 16 is a diagram of another embodiment of a structure inside a sensor.

In the present embodiment of the structure inside the sensor shown in FIG. 9, the acceleration sensor module or angular speed sensor module 3006 and the environmental vibration power generation device 3000 are arranged separately from each other. Both modes may be integrated as an applied example of the present embodiment. A basic structure of this case is shown in FIG. 16. By thus integrating a unit obtaining the acceleration signal or angular speed signal, an effect of downsizing the bodies of the sensors 2021 and 2022 can be obtained.

In FIG. 16, a plurality of instantaneous voltage generators (1) 3104-1 to (n) 3104-$n$ are arranged in one fixing module 3100. Signal detectors (1) 3110-1 to (n) 3110-$n$ are installed for the instantaneous voltage generators (1) 3104-1 to (n) 3104-$n$, respectively. A detailed structure in each of the instantaneous voltage generators (1) 3104-1 to (n) 3104-$n$ and each of the signal detectors (1) 3110-1 to (n) 3110-$n$ may be the same as the structure of the instantaneous voltage generator 3104 or the signal detector 3110 shown in FIG. 11 to FIG. 15. The other structure may be adopted instead if it has means for implementing the same function. Thus, the effect of downsizing the bodies of the sensors 2021 and 2022 can be obtained by commonly arranging the instantaneous voltage generators (1) 3104-1 to (n) 3104-$n$ in the same fixing module 3100 (i.e., commonly using the same fixing module 3100).

In addition, a detection signal obtained from each of the signal detectors (1) 3110-1 to (n) 3110-$n$ is subjected to operation processing inside a signal operator 3200 to extract the acceleration signal or angular speed signal.

Boosters (1) 3106-1 to (n) 3106-n are also installed for the respective instantaneous voltage generators (1) 3104-1 to (n) 3104-n, parallel with the signal processing circuits. A detailed structure in each of the boosters (1) 3106-1 to (n) 3106-n may be the same as the structure of the booster 3106 shown in FIG. 11 to FIG. 15. The other structure may be adopted instead if it has means for implementing the same function. Outputs of the boosters (1) 3106-1 to (n) 3106-n are synthesized by a synthesizer 3210 and the synthesized output is connected to the storage module 3108. In FIG. 16, the boosters are electrically connected inside the synthesizer 3210. Since the capacitor element 3128 is installed to prevent backflow, immediately before the exit of the boosters (1) 3106-1 to (n) 3106-n as shown in FIG. 11 to FIG. 15, no problems occur even if the modules are simply connected electrically as shown in FIG. 16. Instead, however, the power may be synthesized in a method of higher level.

Next, for example, the embodiment in the electrostatic type will be explained as a specific arrangement example of the instantaneous voltage generators (1) 3104-1 to (n) 3104-n shown in FIG. 16. FIG. 17 shows a one-directional sectional arrangement. Electric electrode substrates (1) 3132-1 to (3) 3132-3 and electric members (1) 3134-1 to (3) 3134-3 are sequentially layered and arranged inside the common fixing module 3100.

In contrast, a movable supporter 3139 shaped in a triangular prism is installed in the center of a moving module so as to be movable to the fixing module 3100. Incidentally, in FIG. 17, the movable supporter 3210 is movable in a direction perpendicular to a sheet of the drawing (a frontward direction and a backward direction). In addition, metal electrode substrates (1) 3138-1 to (3) 3138-3 and counter-electrodes (1) 3136-1 to (3) 3136-3 are installed on side surfaces (square surfaces) of the triangular prism of the movable supporter 3210, and all of them are movable synchronously with each other.

Figure 18:
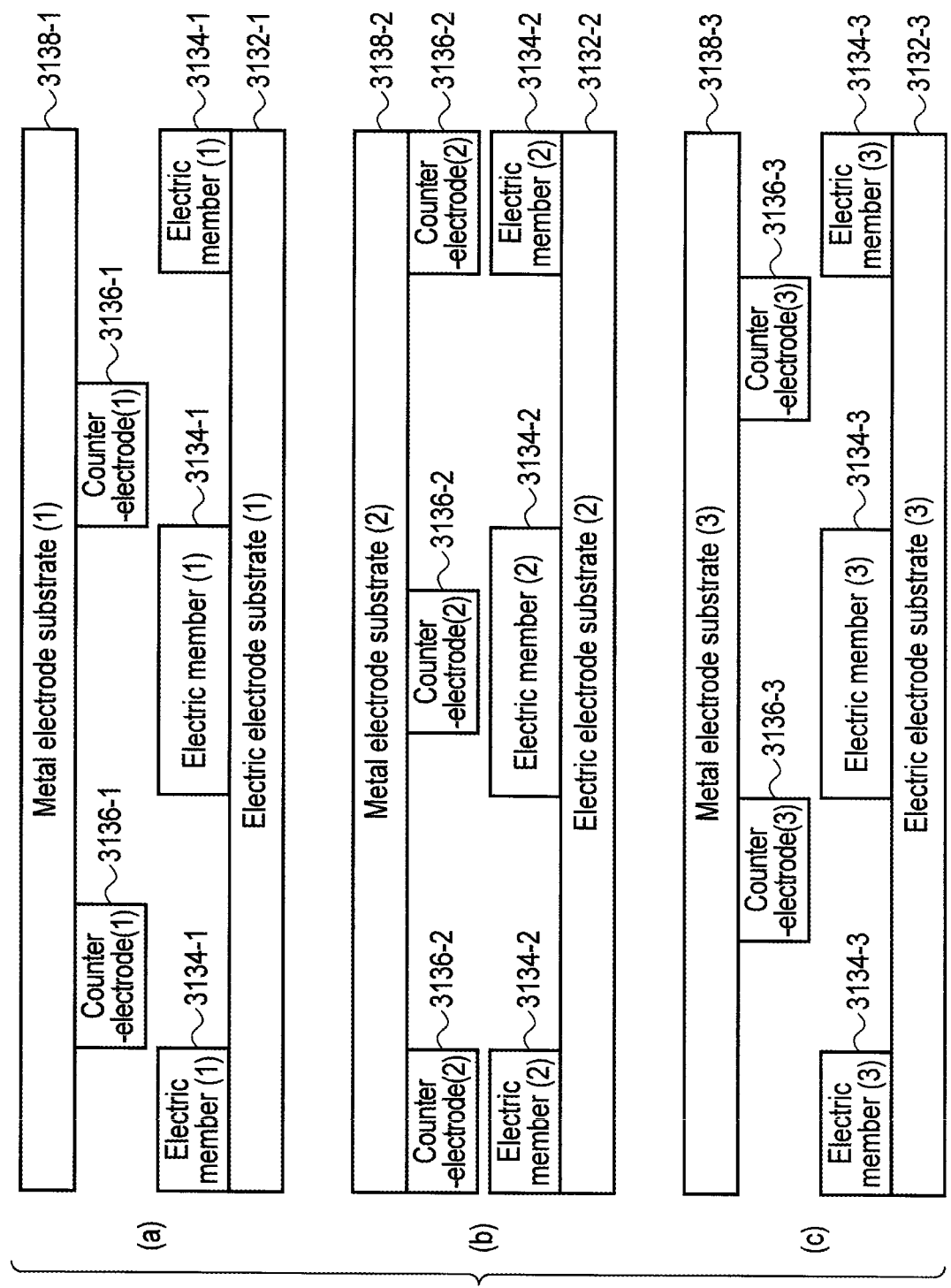
FIG. 18 is an illustration (2) of arrangement of instantaneous voltage generators included in the sensor.

FIG. 18 shows a relationship of arrangement of the counter-electrodes (1) 3136-1 to (3) 3136-3 along the moving direction of the movable supporter 3210. The counter-electrodes (1) 3136-1 to (3) 3136-3 are arranged to be displaced from the electric members (1) 3134-1 to (3) 3134-3, respectively. An effect of simultaneously detecting not only absolute values of the acceleration amount and the angular speed, but a direction of displacement can be obtained by such a displacement.

It is considered based on a positional relationship shown in FIG. 18 that, for example, the metal electrode substrates (1) 3138-1 to (3) 3138-3 are simultaneously displaced to the right and left sides. In this case, the absolute value of the negative charges deposited on the surface of the counter-electrode (2) 3136-2 is reduced irrespective of the direction of displacement. In contrast, if the metal electrode substrates (1) 3138-1 to (3) 3138-3 are simultaneously displaced to the right side, the absolute value of the negative charges deposited on the surface of the counter-electrode (1) 3136-1 is not varied but the absolute value of the negative charges deposited on the surface of the counter-electrode (3) 3136-3 is increased. Conversely, if the metal electrode substrates (1) 3138-1 to (3) 3138-3 are simultaneously displaced to the left side, the absolute value of the negative charges deposited on the surface of the counter-electrode (3) 3136-3 is not varied but the absolute value of the negative charges deposited on the surface of the counter-electrode (1) 3136-1 is increased. Thus, the movement direction and the movement speed variation of the metal electrode substrates (1) 3138-1 to (3) 3138-3 can be recognized from the strength and direction of the current flowing to each of the counter-electrodes (1) 3136-1 to (3) 3136-3 (i.e., from the signal operation result inside the signal operator 3200).

In addition, not only the arrangement shown in FIG. 18, but also the other arrangement may be applied. For example, positions of the electric members (1) 3134-1 to (3) 3134-3 may not be matched but displaced from each other, in the arrangement between the counter-electrodes (1) 3136-1 to (3) 3136-3.

In the above-explanations, the movable supporter 3210 is moved in the one-axis direction, but the acceleration in three-axis directions or the angular speed in three-axis directions can also be detected by extending the same principle.

In the environmental vibration power generation device 3000 shown in FIG. 9, the voltage is gradually stored in the capacitor elements 3122-1 to 3122-8 by continuously generating the acceleration or the angular speed as understood from the explanations of FIG. 11 to FIG. 15. Conversely, if the acceleration or the angular speed is not generated for a long time, the power charged in (the capacitor element 3124 shown in FIG. 11 to FIG. 15, in) the charger 3108 is gradually discharged. Thus, if the environmental vibration power generation device 3000 is left in a stationary state for a long time, the driving power can hardly be supplied to the acceleration sensor module or angular speed sensor module 3006, the near field communication module 3004 or the controller 3002 shown in FIG. 9. In the present embodiment, taking advantage of this characteristic, the acceleration or the angular speed is output immediately after the acceleration or the angular speed becomes small. Thus, an effect of detecting the varied acceleration or angular speed of high accuracy while securing stable supply of the power from the environmental vibration power generation device 3000 can be obtained.

In other words, when the worker works, the power of the environmental vibration power generation device 3000 is stored in the sensors 2021 or 2022 since the sensor 2021 or 2022 is vibrated or rotated. When the worker ends the work, the vibration or rotation of the sensor 2021 or 2022 is stopped, and the system controller 1200 is notified of the stop of vibration or rotation of the sensor 2021 or 2022 in a period in which the power amount is secured in the environmental vibration power generation device 3000.

Extracting the variation timing of the acceleration or angular speed and extracting the acceleration value or angular speed value immediately after the extraction of the variation timing may be executed in the controller 3002 shown in FIG. 9. A method of extracting the variation timing of the acceleration or angular speed and extracting the acceleration value or angular speed value immediately after the extraction of the variation timing will be explained with reference to FIG. 19. The acceleration value or angular speed value obtained from the signal operator 3200 shown in FIG. 16 is input into controller 3002. A referential timing generator 3302 is provided in the controller 3002, and the acceleration signal or angular speed signal transmitted from the signal operator 3200 is processed for each referential timing generated by the referential timing generator 3302.

As an index of detecting the variation in acceleration or angular speed, a total value of "angular speeds in a certain rotational direction" or an average value at each timing may be used when the variation in angular speed is detected. When the variation in acceleration is detected, "an absolute value of the acceleration", "an amplitude value of the variation signal varying in the positive or negative direction" or the like may be calculated and the total value or average value may be calculated at each timing, since reverse in the acceleration direction is often repeated. In addition, an absolute value operation or amplitude calculation of the angular speed may be executed or the total value calculation or average calculation of the acceleration may be executed by considering the direction. The operation processing is executed in a predetermined-period storage/average calculator 3304.

In the present embodiment, comparison between a previously calculated value of each predetermined timing and the calculated value subsequent to the calculated value is used for extraction o the variation timing. In other words, the index obtained by the predetermined-period storage/average calculator 3304 is temporarily stored in a temporary calculation result storing module 3306 and, comparison with an index obtained by the predetermined-period storage/average calculator 3304 immediately after this is executed by a comparator 3308. If a comparison result exceeds a predetermined value (if the index value is greater or smaller than the predetermined value), the comparison result is considered to be "greatly varied" and, the voltage is output (a flag is displayed) to a variation timing notification terminal 3314. Timing of change of the output value at the change timing notification terminal 3314 represents the variation timing. Simultaneously with this, the index value obtained immediately after the change is output to a changed value output terminal 3312.

Figure 19:
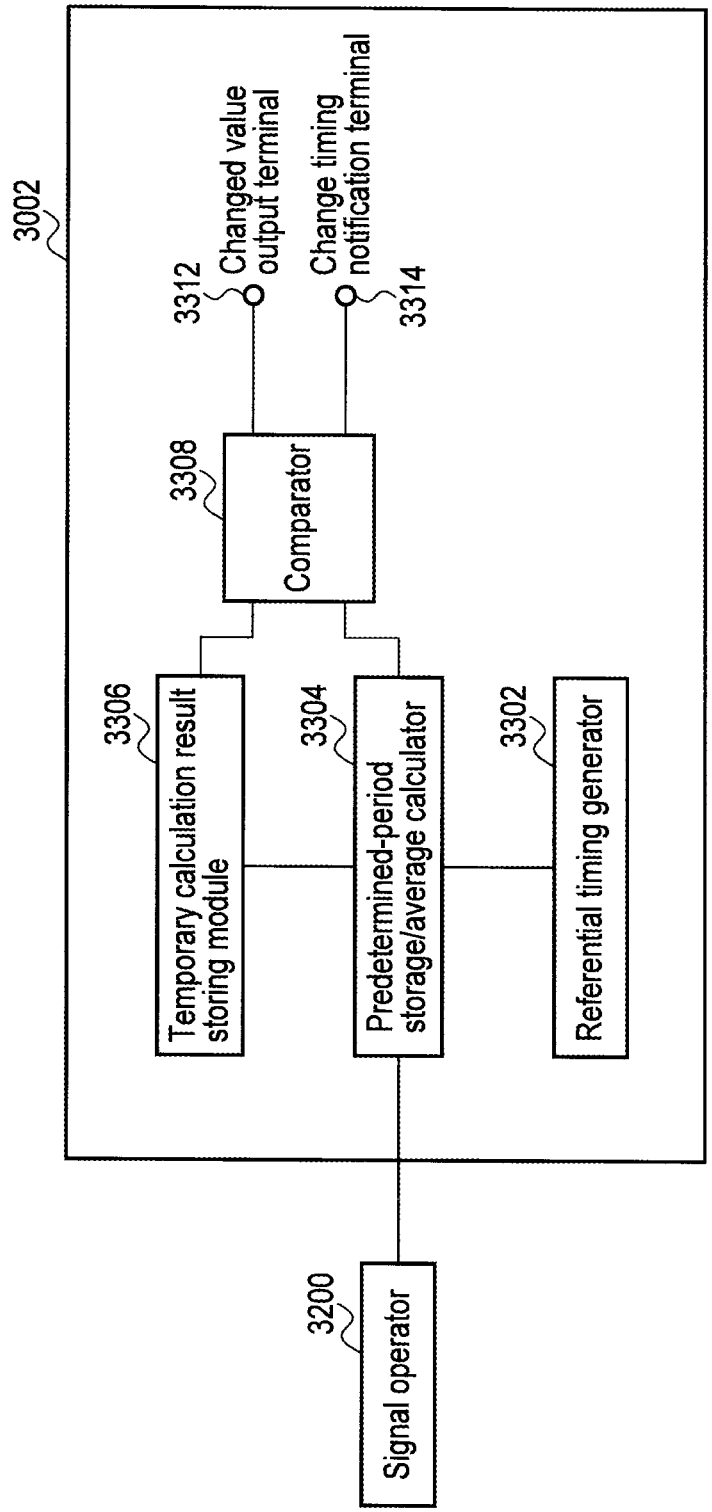
FIG. 19 is a diagram for explanation of a method of detecting values of varied acceleration/angular speed in a control module.

The extracting method is represented in a form of circuit block diagram in FIG. 19, but the processing method may also be executed by program/software executed in the processor.

An output value of the changed value output terminal 3312 is transmitted from the near field communication module 3004 (FIG. 9) to the system controller 1200 (FIG. 7A) with the change timing of the output value at the change timing notification terminal 3314 used as a trigger. A communication information structure used for this communication is illustrated in FIG. 20.

Synchronous header SYNC is first transmitted in five bytes, and then followed by receiving side address DADRS represented in sixteen bytes similarly to transmitting side address SADRS represented in sixteen bytes. After changed value VACHG is transmitted immediately after the transmission, error-correction code CRC is last transmitted. The value output to the changed value output terminal 3312 shown in FIG. 19 is format-converted and arranged in changed value VACHG.

The sensors 2021 or 2022 capable of detecting the above-explained acceleration or angular speed may be employed in not only the work location explained with reference to FIG. 6, but also any other applied fields. For example, the sensor can also be employed in an infrastructural health market such as automatic diagnosis of deteriorated conditions of infrastructural installations in a social infrastructural environment. More specifically, the sensor 2021 or 2022 used in the present embodiment system may be employed in a hammering test for partial degradation inspection in a railroad bridge or a tunnel (i.e., a test of expecting a deteriorated part from a pitch or tone of a sound generated by hammering a part of infrastructural installations). In this case, the sensor 2021 or 2022 is fixed on a pillar, a wall or a ceiling of the railroad bridge or tunnel with the adhesive element 3008 at the portion which is in contact with the existing environment or the existing device. The sensor 2021 or 2022 detects a vibration generated when the worker hammers a specified part, and the system controller 1200 (FIG. 7) collects the detection result to expect a deteriorated part.

Next, information collected in the system controller 1200 (FIG. 7) after receiving the communication information having the structure shown in FIG. 20 will be explained with the embodiment explained with reference to FIG. 6. FIG. 21(*a*) shows steps before and after a screw fastening work. A vibration condition obtained before the worker approaches a screw is a status of a general period 3402. Then, when the worker starts fastening the screw, the period shifts to a screw fastening period 3404. When fastening the screw is ended, the period shifts to a period after end of fastening 3406.

FIG. 21(*b*) shows an acceleration value or angular speed value measured at a position of the screw 2001 in each step. The device becomes in a general vibration state in the general period 3402 before the screw fastening work, and returns to the general vibration state when the screw fastening work is completed, i.e., when fastening the screw is ended, in 3406. As a result, the acceleration or angular speed is greatly varied at a moment at which the general period 3402 shifts to the screw fastening period 3404 and a moment at which the screw fastening period 3404 changes to the end of fastening 3406.

The moment at which the acceleration or angular speed is greatly varied is automatically extracted and, immediately after this, the acceleration value or angular speed value (or the storage amount or average value in the predetermined period) is transmitted to the system controller 1200 as information shown in FIG. 21(*c*).

Figure 22:
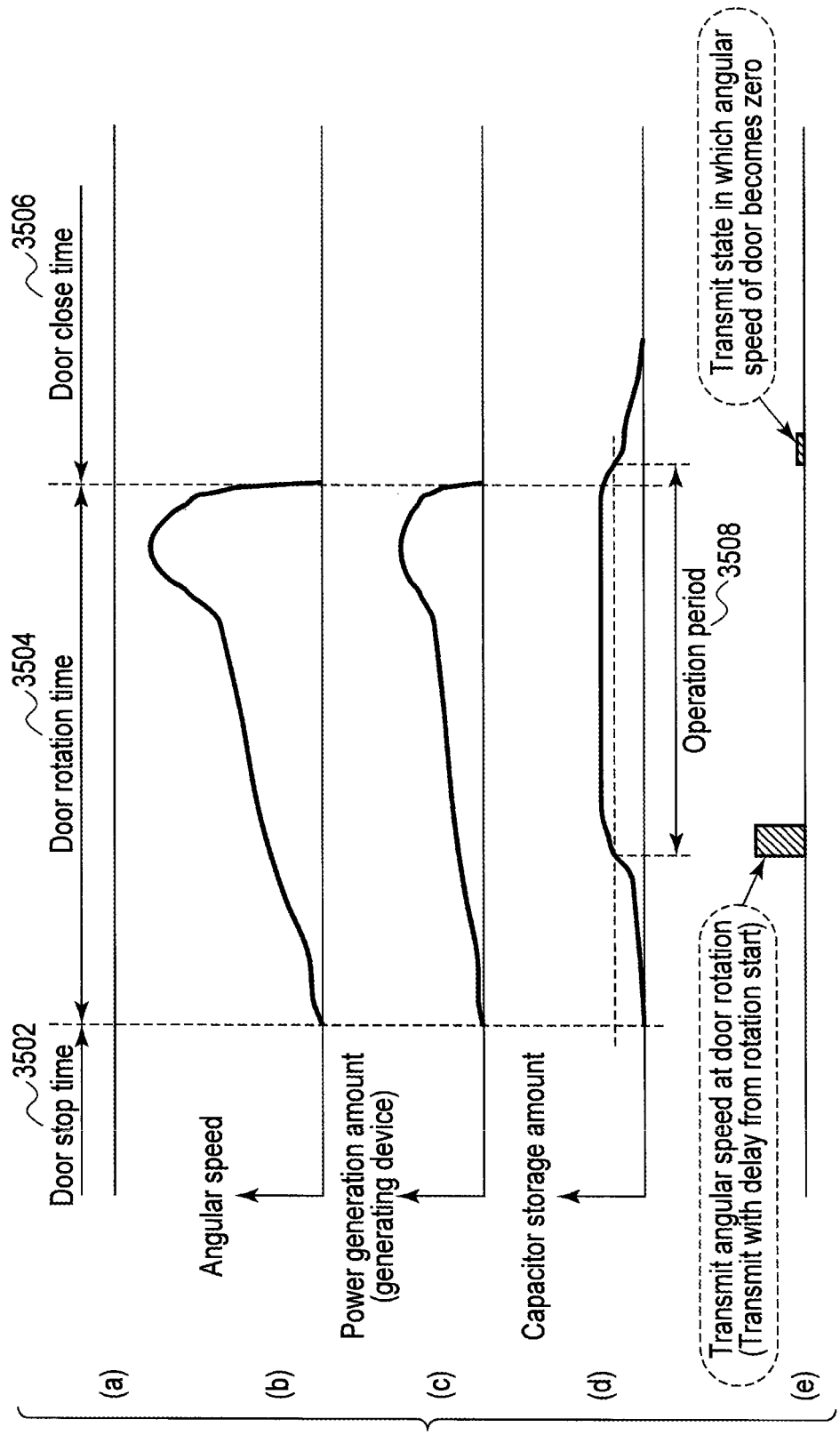
FIG. 22 is an illustration for explanation of a state of angular speed variation generated when a door is closed.

FIG. 22 shows an angular speed variation detected by the sensor 2022 on the door when the door 2006 of the embodiment explained with reference to FIG. 6 is closed. The timing can be divided into a door stop time 3502, a door rotation time 3504, and a door close time 3506 as shown in FIG. 22(*a*). FIG. 22(*b*) shows an angular speed variation detected by the sensor 2022 on the door in each period. The angular speed value becomes great at the door rotation time 3504, and becomes greatest immediately before the door is closed. FIG. 22(*c*) shows an example of a storage amount (power generation amount) in the environmental vibration power generation device 3000 (FIG. 9) at this time. The power generation (storage) in the environmental vibration power generation device 3000 is not started until the door rotation is started. The, the near field communication module 3004 and the controller 3002 operate in an operation period 3508 in the only period in which the storage amount exceeds a predetermined value.

The near field communication can be executed in the only operation period 3508. Thus, the information which should be transmitted to the system controller 1200 (FIG. 7A) is transmitted with a delay from the start of door rotation as shown in FIG. 22(*e*). Since the timing of change from the door rotation time 3504 to the door close time 3506 is in the operation period 3508, information of "angular speed of door at zero" is transmitted immediately after the timing of change.

In the embodiment system shown in FIG. 7A or FIG. 7B, the near field communication between the sensor 2500 or 1152 and the system controller 1200 can be established at any time when the power supply to the sensors 2500 and 1152 is stably executed at any time. The timing of near field communication between the sensor 2500 or 1152 or glass 1100 and the system controller 1200, which can stably supply the power, is therefore basically controlled by the system controller 1200.

In contrast, the sensor 2021 or 2022 receiving the power supply from the environmental vibration power generation device 3000 can execute near field communication in the only operation period 3508 as shown in FIG. 22(*d*). This timing cannot be preliminarily expected by the system controller 1200. In the present embodiment system, the only sensor 2021 or 2022 receiving the power supply from the environmental vibration power generation device 3000 is therefore assigned an authority to control the timing of the near field communication. An effect of executing stable near field communication can be thereby obtained.

Incidentally, in this case, the timing of the near field communication managed by the system controller 1200 and the timing of the near field communication executed voluntarily by the sensor 2021 or 2022 overlap, and a factor of unstable near field communication is caused. To solve this problem, in the present embodiment system, a wireless band (wireless reference frequency) of the near field communication managed by the system controller 1200 is separated from a wireless band (wireless reference frequency) of the near field communication executed voluntarily by the sensor 2021 or 2022, to prevent crosstalk between the both modules. Thus, stability of the near field communication managed by the system controller 1200 can be thereby attempted.

Even if the crosstalk between the both modules is prevented by changing the wireless band (wireless reference frequency) as explained above, a risk that crosstalk is caused by simultaneously transmitting signals from the both sensor 2021 and the sensor 2022 may occur. To eliminate the inconvenience, in the present embodiment system, a receive antenna having a structure shown in FIG. 23 is used by the system controller 1200 (FIG. 7).

Figures 23A, 23B:
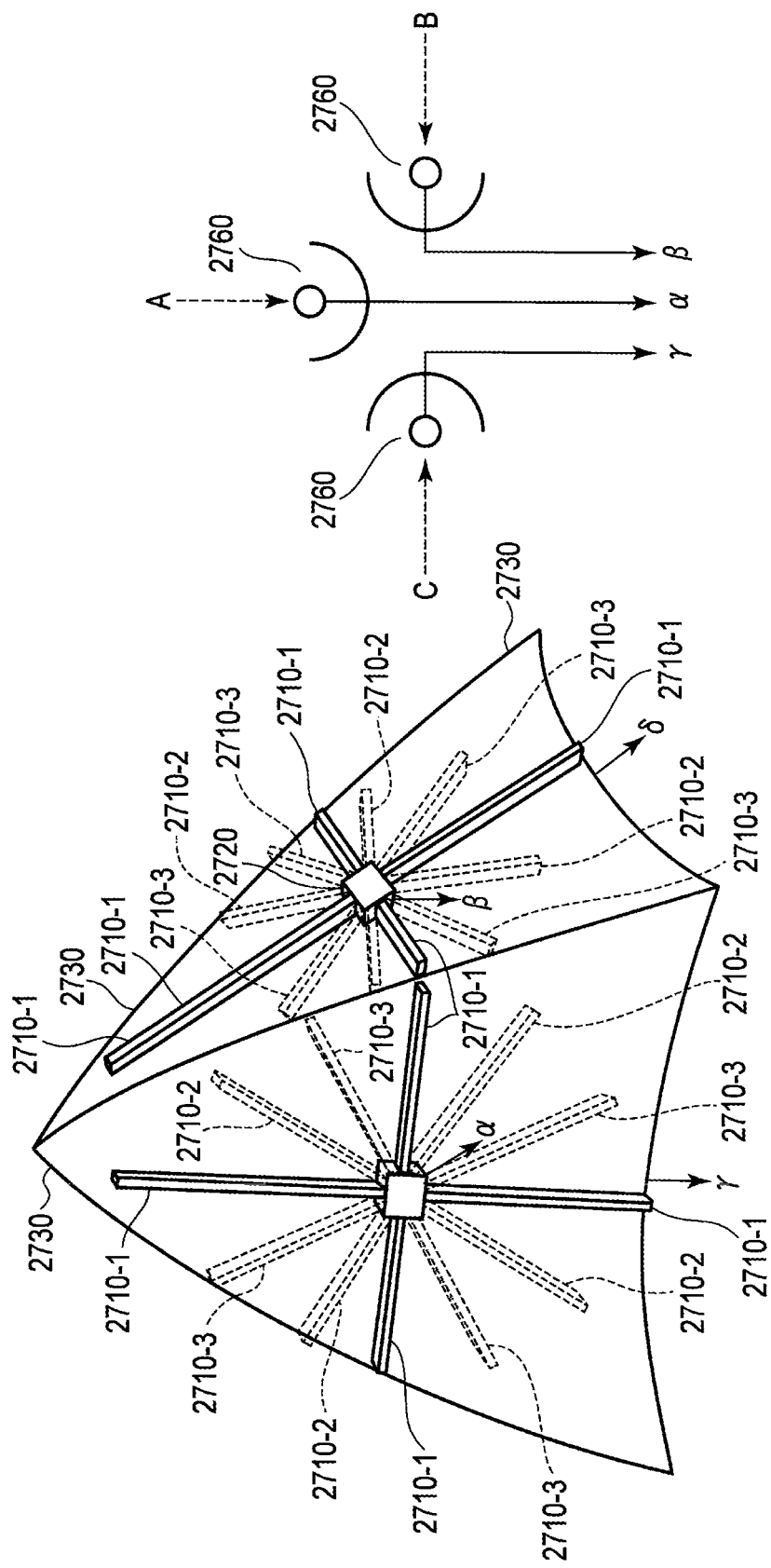
FIG. 23A is an illustration of a structure of a receive antenna used in the system controller.
FIG. 23B is an illustration of a principle of signal reception of the receive antenna shown in FIG. 23A.

The basic structure is composed of a stealth plate 2730 formed in a shape of an approximately triangular pyramid or an approximately quadrangular pyramid. Then, antennas 2710-1 in a cross shape are arranged on each side surface of the approximately triangular pyramid or approximately quadrangular pyramid. The antennas 2710-1 are composed of a set of antennas orthogonal to each other. A set of antennas 2710-1 orthogonal in a cross shape may be arranged on a side surface of the stealth plate 2730, as represented by a solid line in FIG. 23A. Alternatively, plural sets of antennas 2710-1 orthogonal in a cross shape may also be arranged on a side surface of the stealth plate 2730, as represented by broken lines in FIG. 23B. The antennas 2710-2 and 2710-3 represented by broken lines in FIG. 23B are attached to rotate by thirty degrees from the antennas 2710-1 orthogonal in a cross shape. The communication information transmitted from the sensor 2021 or 2022 receiving the power supply from the environmental vibration power generation device 3000 is received by the antennas 2710-1 arranged in a cross shape. An amplifier and a signal processing circuit are arranged between the antennas 2710-1 to 2710-3 arranged in a cross shape. Incidentally, the antenna structure does not need to be exactly shaped in a triangular pyramid or a quadrangular pyramid, and the side surfaces of the plural stealth plates 2730 may face in different directions.

The detection sensitivity of the cross-shaped antennas 2710 arranged on the side surface of the stealth plate 2730 shown in FIG. 23A depends on a receiving direction. The transmitting direction of the sensor 2021 or 2022 can be identified by comparison between the detection signals from the respective side surfaces obtained from each amplifier and signal processing circuit.

In the above embodiments, although eyeglasses-type wearable terminals were shown, the present invention is not limited to this type of glasses. And the work contains various meanings and contains what is produced by the act according [for example,] to persons, such as check, an inspection, operation, opening and closing, insertion, discharge, extraction, and contact.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Furthermore, the components of claims are in the category of the embodiments even if the components are expressed separately, even if the components are expressed in association with each other or even if the components are expressed in combination with each other. In addition, even if a claim is expressed as control logic, a program including an instruction to urge a computer to be executed, or a computer-readable storage medium storing the instruction, the device of the embodiments is applied to the claim.

What is claimed is:

1. A wearable device configured to be attached to a display, the display configured to display an image, the wearable device comprising:
   a lens configured to form a virtual image of the image displayed by the display;
   an operable member configured to be operated by the wearer;
   a detector configured to detect a wearer's state;
   a communication device configured to receive data and a program from an external device; and
   a memory configured to store the program, wherein
   the wearer's state corresponds to a movement of or a stopping by the wearer,
   a function of the wearable device is modified by rewriting the program by the external device,
   the operable member causes a projection angle of the virtual image to change,
   a display position of the virtual image is adjusted by changing the projection angle using the operable member so that the virtual image is displayed at a position according to at least one of a shape or a size of a head of the wearer,
   the wearable device is configured to execute the function based on the program;
   the display is configured to display a first virtual image indicative of a work when the detector detects the stopping of the wearer after detecting the movement of the wearer, and
   the display is configured to display a second virtual image indicative of a first warning when the detector does not detect the stopping of the wearer in a predetermined time after detecting the movement of the wearer.

2. The wearable device of claim 1, comprising:
   a wearing part configured to be mounted on the head of the wearer; and
   an attachment part configured to be attached to the wearing part, wherein
   the attachment part includes the lens, the operable member, the communication device, and the memory.

3. The wearable device of claim 1, wherein the display position of the virtual image is adjusted by changing the projection angle using the operable member while the wearer views the virtual image.

4. The wearable device of claim 1, wherein the lens is configured to form the virtual image together with a background image seen by the wearer.

5. The wearable device of claim 1, wherein
the display is configured to display a third virtual image indicative of a movement to a first location when the detector detects the stopping of the wearer, and
the display is configured to display a fourth virtual image indicative of a second warning when the detector detects the stopping of the wearer and the wearer does not stop at the first location.

6. A method for a wearable device configured to be attached to a display, the display configured to display an image, the wearable device comprises a lens configured to form a virtual image of the image displayed by the display, an operable member configured to be operated by the wearer, the operable member including a rotary member, the rotary member causing a projection angle of the virtual image to change, a detector configured to detect a wearer's state, the wearer's state corresponding to a movement or a stopping, a communication device configured to receive a program from an external device, and a memory configured to store the program, the method comprising:
adjusting a display position of the virtual image by changing the projection angle using the operable member so that the virtual image is displayed at a position according to at least one of a shape or a size of a head of the wearer,
executing the function based on the program;
modifying the function of the wearable device by rewriting the program by the external device;
displaying a first virtual image indicative of a work when the detector detects the stopping of the wearer after detecting the movement of the wearer, and
displaying a second virtual image indicative of a first warning when the detector does not detect the stopping of the wearer in a predetermined time after detecting the movement of the wearer.

7. The method of claim 6, wherein the wearable device comprises a wearing part configured to be mounted on the head of the wearer and an attachment part configured to be attached to the wearing part, wherein the attachment part includes the lens, the operable member, the communication device, and the memory.

8. The method of claim 6, wherein
the display position of the virtual image is adjusted by changing the projection angle using the operable member while the wearer views the virtual image.

9. The method for the wearable device of claim 6, wherein the lens is configured to form the virtual image together with a background image seen by the wearer.

10. The method of claim 6, further comprising:
displaying a third virtual image indicative of a movement to a first location when the detector detects the stopping of the wearer; and
displaying a fourth virtual image indicative of a second warning when the detector detects the stopping of the wearer and the wearer does not stop at the first location.

11. A system comprises:
a server; and
a wearable device connectable to the server, wherein
the server is configured to transmit data and a program to the wearable device,
the wearable device is configured to be attached to a display,
the display is configured to display an image,
the wearable device comprises:
a lens configured to form a virtual image of the image displayed by the display;
an operable member configured to be operated by a wearer;
a detector configured to detect a wearer's state, the wearer's state corresponding to a movement or a stopping;
a communication device configured to receive the program from the server; and
a memory configured to store the program received by the communication device,
the server is configured to modify a function of the wearable device by rewriting the program stored in the memory,
the operable member is configured to cause a projection angle of the virtual image to change,
a display position of the virtual image is adjusted by changing the projection angle using the operable member so that the virtual image is displayed at a position according to at least one of a shape or a size of a head of the wearer,
the wearable device is configured to execute the function based on the program stored in the memory,
the display is configured to display a first virtual image indicative of a work when the detector detects the stopping of the wearer after detecting the movement of the wearer, and
the display is configured to display a second virtual image indicative of a first warning when the detector does not detect the stopping of the wearer in a predetermined time after detecting the movement of the wearer.

12. The system of claim 11, wherein the wearable device comprises:
a wearing part configured to be mounted on the head of the wearer; and
an attachment part configured to be attached to the wearing part, wherein
the attachment part includes the lens, the operable member, the communication device, and the memory.

13. The system of claim 11, wherein
the display position of the virtual image is adjusted by changing the projection angle using the operable member while the wearer views the virtual image.

14. The system of claim 11, wherein the lens is configured to form the virtual image together with a background image seen by the wearer.

15. The system of claim 11, wherein
the display is configured to display a third virtual image indicative of a movement to a first location when the detector detects the stopping of the wearer, and
the display is configured to display a fourth virtual image indicative of a second warning when the detector detects the stopping of the wearer and the wearer does not stop at the first location.

* * * * *